United States Patent
Huang et al.

(10) Patent No.: US 11,638,213 B2
(45) Date of Patent: Apr. 25, 2023

(54) COMMUNICATION APPARATUS AND COMMUNICATION METHOD

(71) Applicant: Panasonic Intellectual Property Corporation of America, Torrance, CA (US)

(72) Inventors: Lei Huang, Singapore (SG); Yoshio Urabe, Nara (JP); Rojan Chitrakar, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/637,714

(22) PCT Filed: Aug. 7, 2018

(86) PCT No.: PCT/JP2018/029535
§ 371 (c)(1),
(2) Date: Feb. 7, 2020

(87) PCT Pub. No.: WO2019/044421
PCT Pub. Date: Mar. 7, 2019

(65) Prior Publication Data
US 2020/0178178 A1    Jun. 4, 2020

(30) Foreign Application Priority Data

Aug. 30, 2017 (JP) .............................. JP2017-165789
Dec. 21, 2017 (JP) .............................. JP2017-245247

(51) Int. Cl.
*H04W 52/02* (2009.01)

(52) U.S. Cl.
CPC ..... *H04W 52/0235* (2013.01); *H04W 52/028* (2013.01)

(58) Field of Classification Search
CPC ............ H04W 36/0069; H04W 36/00; H04W 36/0022; H04W 76/15; H04W 76/25;
(Continued)

(56) References Cited

U.S. PATENT DOCUMENTS

| 2014/0112225 A1 | 4/2014 | Jafarian et al. |
| 2014/0112226 A1 | 4/2014 | Jafarian et al. |

(Continued)

OTHER PUBLICATIONS

International Search Report of PCT application No. PCT/JP2018/029535 dated Nov. 27, 2018.
(Continued)

*Primary Examiner* — Omer S Mian
(74) *Attorney, Agent, or Firm* — Seed IP Law Group LLP

(57) ABSTRACT

A communication apparatus comprises primary connectivity radio (PCR) circuitry which, in operation, exchanges a wake up radio (WUR) mode setup frame with a communication partner apparatus in awake state; and wake up radio (WUR) circuitry which, in operation, receives a wake-up frame from the communication partner apparatus, wherein upon successful completion of the WUR mode setup frame exchange in mode other than WUR mode, the communication apparatus enters the WUR mode in which the WUR circuitry is in state to receive a WUR frame, and wherein upon receiving the wake-up frame by the WUR circuitry in the WUR mode, the PCR circuitry changes current state to the awake state.

4 Claims, 24 Drawing Sheets

(58) Field of Classification Search
CPC ............ H04W 88/06; H04W 52/0235; H04W 52/028; H04W 52/0229; Y02D 30/70
See application file for complete search history.

(56) References Cited

U.S. PATENT DOCUMENTS

| | | | |
|---|---|---|---|
| 2017/0026907 | A1 | 1/2017 | Min et al. |
| 2018/0049131 | A1* | 2/2018 | Huang ............... H04W 52/0248 |
| 2018/0288703 | A1* | 10/2018 | Sun ................... H04W 52/0229 |
| 2019/0028967 | A1* | 1/2019 | Ahn ........................ H04B 7/02 |
| 2019/0045445 | A1* | 2/2019 | Huang .............. H04W 72/0446 |
| 2019/0246356 | A1* | 8/2019 | Kim ...................... H04W 76/11 |
| 2020/0045635 | A1* | 2/2020 | Lin ..................... H04L 27/2627 |

OTHER PUBLICATIONS

IEEE 802.11-17/0379r4, "SFD MAC proposal", Mar. 13, 2017.
IEEE 802.11-17/0342r4, "WUR Negotiation and Acknowledgement Procedure Follow up", Mar. 12, 2017.
IEEE 802.11-17/0071r0, "High Level MAC Concept for WUR", Jan. 12, 2017.
IEEE 802.11-17/0070r0, "Initial Negotiation for WUR", Jan. 16, 2017.
IEEE 802.11-17/0575r3, "Specification Framework for TGba", Aug. 8, 2017.
IEEE 802.11-17/0954r2, "WUR Mode Signaling", Jul. 10, 2017.
IEEE 802.11-17/1065r0, "Power Consumption Evaluation for a Few WUR MAC Procedures", Jul. 10, 2017.
IEEE 802.11-16/1445r1, "Overall MAC Procedure for WUR", Nov. 7, 2016.
IEEE 802.11-17/0953r0, "WUR Mode Discussion", Jul. 10, 2017.
The Extended European Search Report dated Sep. 2, 2020 for the related European Patent Application No. 18852557.0, 12 pages.
Huang et al., "Examples of Integrating WUR with Existing Power Save Protocol", Intel, Santa Clara, CA, May 8, 2017, Doc.: IEEE 802.11-17/0653r0, 9 pages.
Po-Kai Huang(Intel), WUR Beacon, IEEE 802.11-17/0343r3, IEEE, Internet <URL:https://mentor.ieee.org/802.11/dcn/17/11-17-0343-03-00ba-wur-beacon.pptx>, Mar. 17, 2017.

* cited by examiner

| Name | Action Type value |
|---|---|
| WUR negotiation | 0 |
| WUR mode entry | 1 |
| Integrated WUR negotiation and WUR mode entry | 2 |
| WUR mode exit | 3 |
| Reserved | 4-255 |

[Fig. 15]
1500
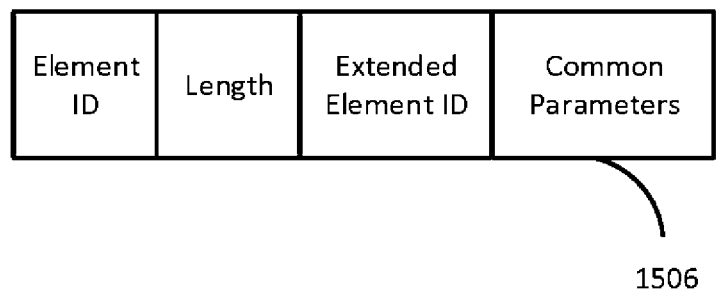
1506
[Fig. 16A]
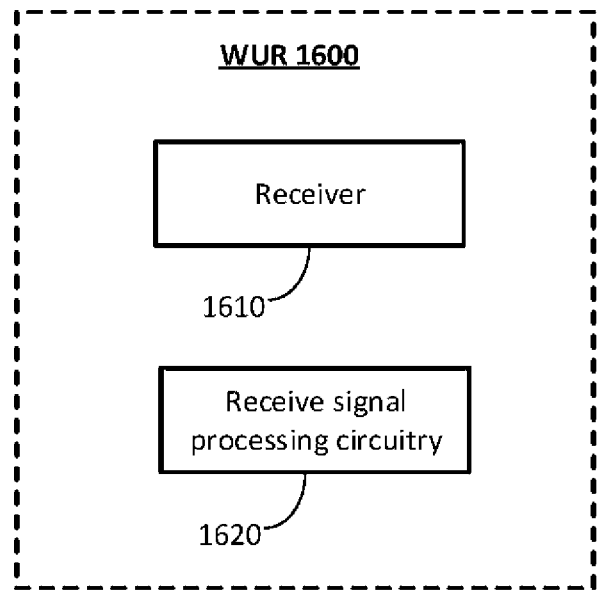

[Fig. 16B]
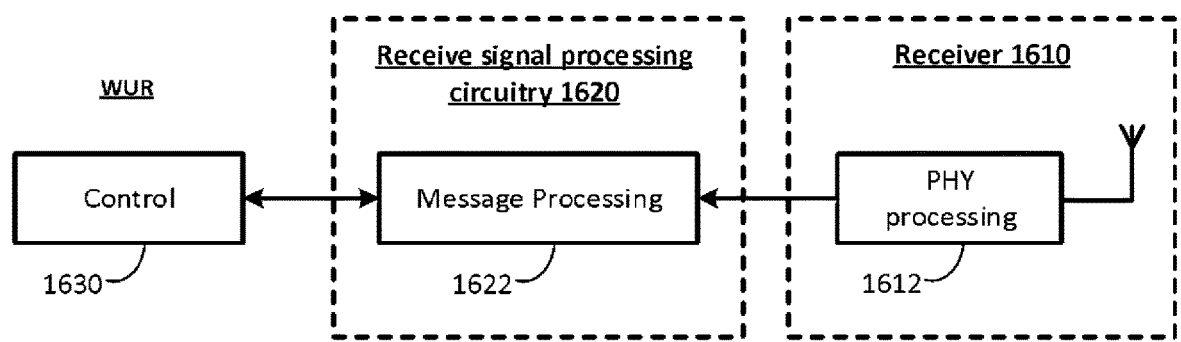
[Fig. 17A]
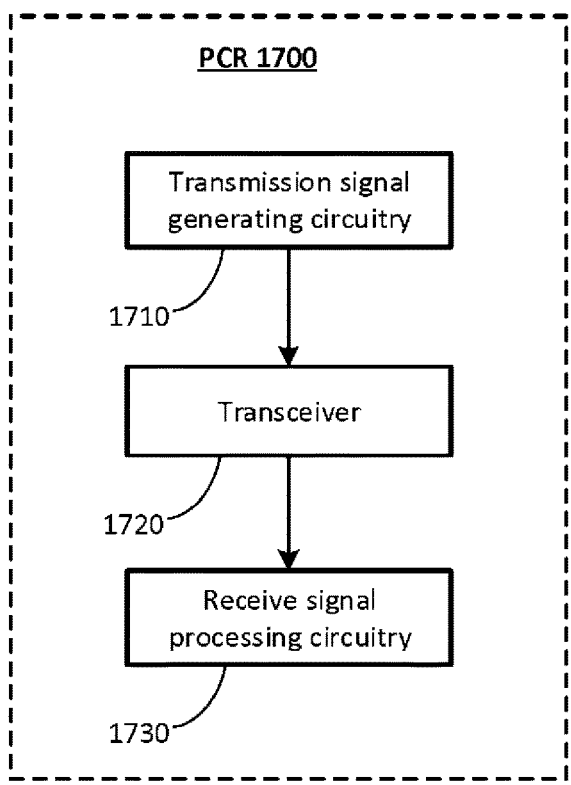

[Fig. 17B]
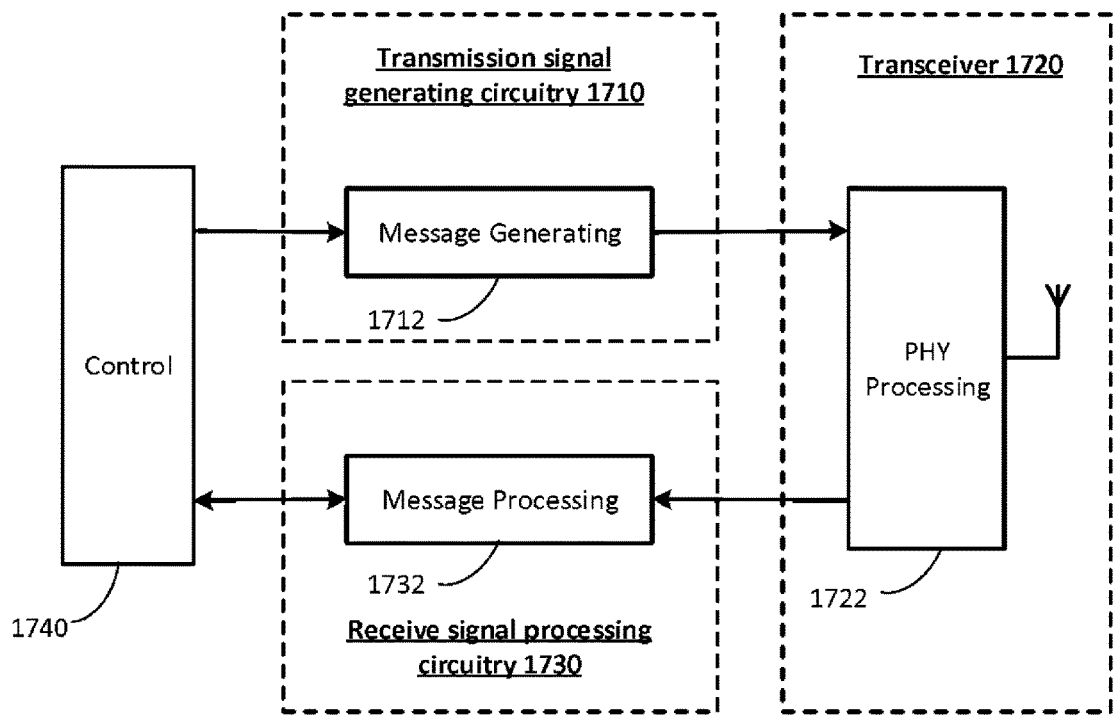
[Fig. 18]
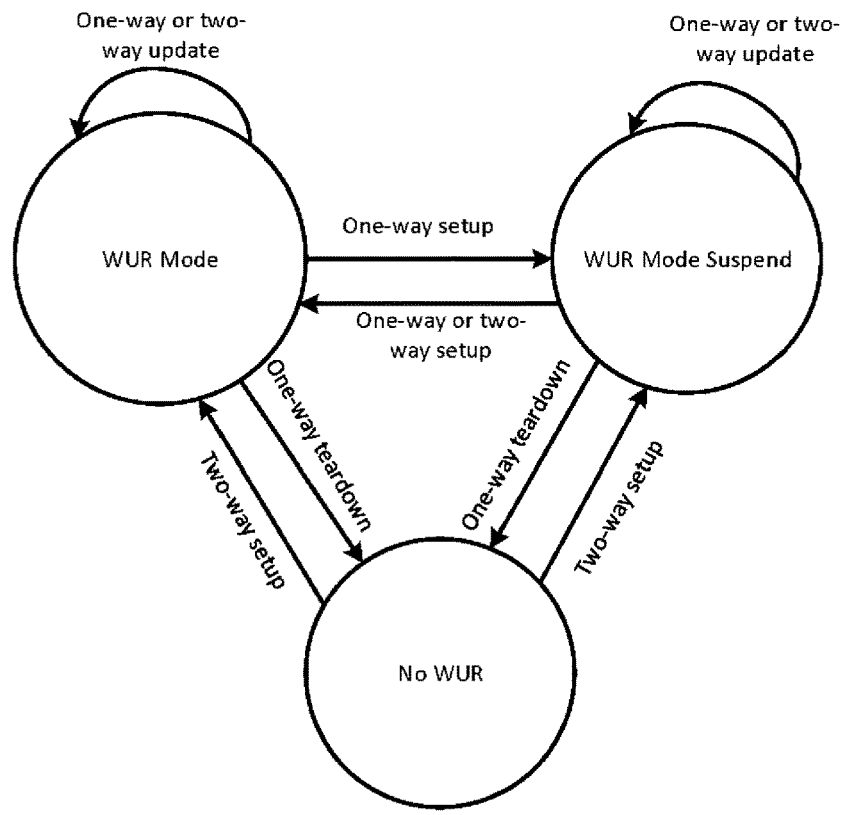

[Fig. 19A]
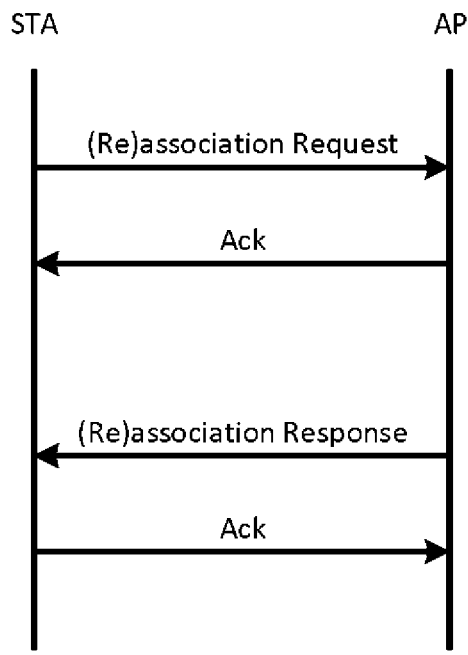
[Fig. 19B]
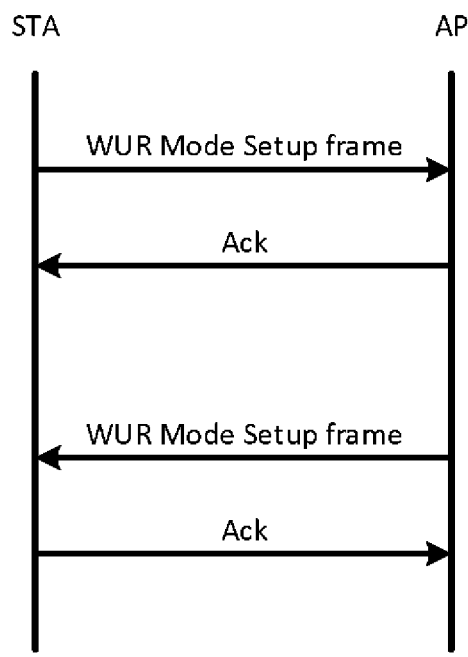

[Fig. 20A]
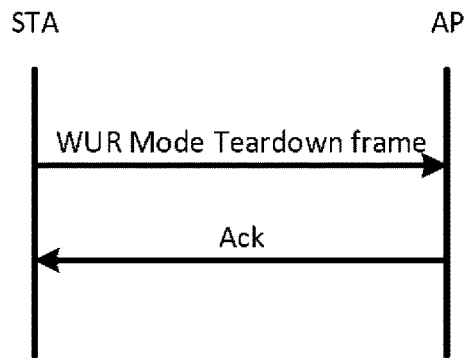
[Fig. 20B]
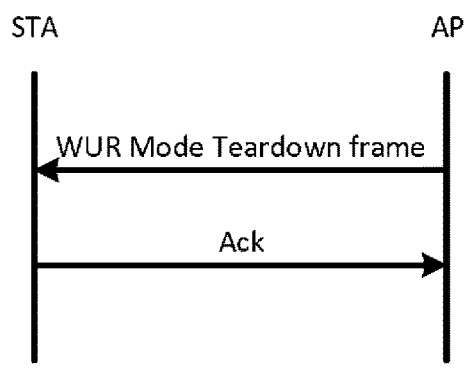
[Fig. 21A]
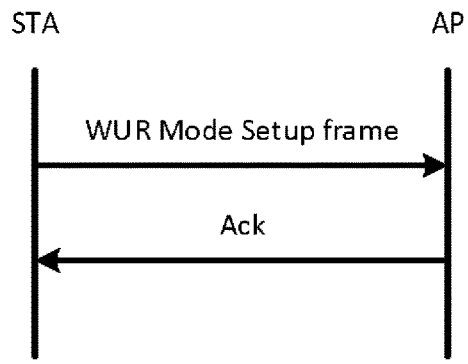

[Fig. 21B]
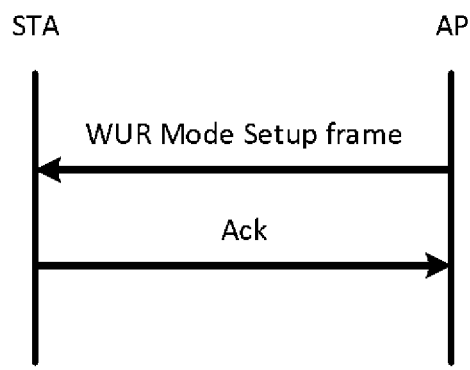
[Fig. 22]
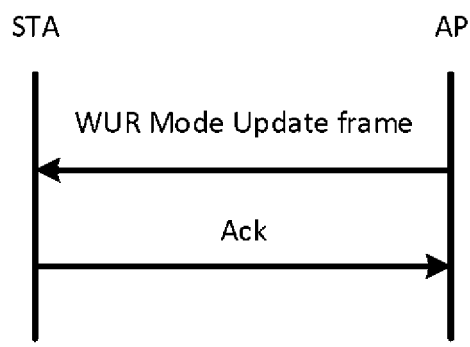

[Fig. 23]
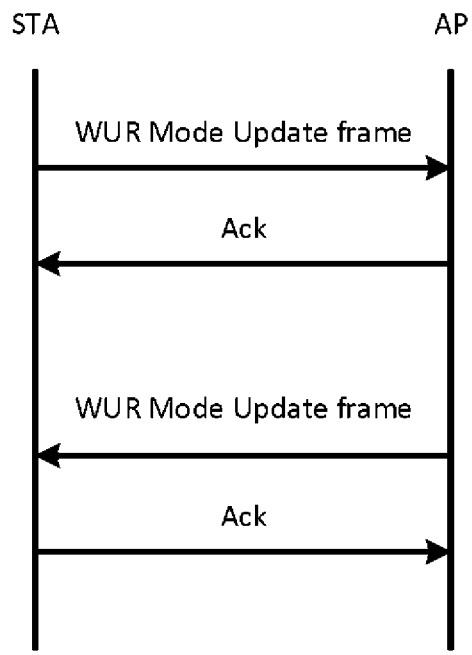
[Fig. 24]
| WUR Action field value | Meaning |
|---|---|
| 0 | WUR Mode Setup |
| 1 | WUR Mode Teardown |
| 2 | WUR Mode Update |

[Fig. 25]

| Action Type field value | Meaning |
| --- | --- |
| 0 | Enter WUR Mode Request |
| 1 | Enter WUR Mode Response |
| 2 | Enter WUR Mode Suspend Request |
| 3 | Enter WUR Mode Suspend Response |
| 4 | Enter WUR Mode Suspend |
| 5 | Enter WUR Mode |
| 6 | Update WUR Parameters Request |
| 7 | Update WUR Parameters Response |
| 8 | Update WUR Parameters |

[Fig. 26]

| WUR Mode Response Status field value | Meaning |
| --- | --- |
| 0 | Enter WUR Mode Accept |
| 1 | Enter WUR Mode Suspend Accept |
| 2 | Denied |

COMMUNICATION APPARATUS AND COMMUNICATION METHOD

TECHNICAL FIELD

The present disclosure is generally related to a communication apparatus and a communication method.

BACKGROUND ART

The IEEE (Institute of Electrical and Electronics Engineers) 802.11 Working Group is defining a physical (PHY) layer specification and modifications on medium access control (MAC) layer specification that enable operation of a wake-up radio (WUR) apparatus. The WUR apparatus is a companion radio apparatus to a primary connectivity radio (PCR) apparatus, e.g., IEEE 802.11a/b/g/n/ac/ax radio apparatus. The PCR apparatus included in a wireless communication device is used for user data transmission and reception; while the WUR apparatus included in the device is not used for user data transmission and reception. For the wireless communication device operating in WUR mode, when the PCR apparatus included in the device turns off, the WUR apparatus included in the device turns on or periodically turns on or off. Once the WUR apparatus of the device receives a wake-up signal alerting that there is traffic for the PCR apparatus of the device to receive, the device turns on the PCR apparatus.

CITATION LIST

Non Patent Literature

[NPL 1] IEEE 802.11-17/0379r4, SFD MAC proposal, May 2017

[NPL 2] IEEE 802.11-17/0342r4, WUR Negotiation and Acknowledgement Procedure Follow up, March 2017

[NPL 3] IEEE 802.11-17/0071r0, High Level MAC Concept for WUR, January 2017

[NPL 4] IEEE 802.11-17/0070r0, Initial Negotiation for WUR, January 2017

[NPL 5] IEEE 802.11-17/0575r3, Specification Framework for TGba, August 2017

SUMMARY OF INVENTION

Studies are underway on how a wireless communication device is able to perform WUR mode operation in an efficient manner.

One non-limiting and exemplary embodiment of the present disclosure facilitates performing WUR mode operation in an efficient manner.

In one general aspect, the techniques disclosed here feature: A communication apparatus comprises primary connectivity radio (PCR) circuitry which, in operation, exchanges a wake up radio (WUR) mode setup frame with a communication partner apparatus in awake state; and wake up radio (WUR) circuitry which, in operation, receives a wake-up frame from the communication partner apparatus, wherein upon successful completion of the WUR mode setup frame exchange in mode other than WUR mode, the communication apparatus enters the WUR mode in which the WUR circuitry is in state to receive a WUR frame, and wherein upon receiving the wake-up frame by the WUR circuitry in the WUR mode, the PCR circuitry changes current state to the awake state.

It should be noted that general or specific embodiments may be implemented as a system, a method, an integrated circuit, a computer program, a storage medium, or any selective combination thereof.

By taking advantage of the communication apparatus and the communication method described in the present disclosure, a wireless communication device is able to perform WUR mode operation in an efficient manner.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 13 is a diagram illustrating the example format of Action Type field according to the present disclosure.

FIG. 15 is a diagram illustrating the example format of WUR Operation element according to the second aspect of the present disclosure.

FIG. 16A is a simple block diagram of an example WUR according to the present disclosure.

FIG. 16B is a detailed block diagram of an example WUR according to the present disclosure.

FIG. 17A is a simple block diagram of an example PCR according to the present disclosure.

FIG. 17B is a detailed block diagram of an example PCR according to the present disclosure.

FIG. 18 is a diagram illustrating simplified WUR mode operation related state transition for a wireless communication device according to the present disclosure.

FIG. 19A is a diagram illustrating a first example two-way setup procedure according to the present disclosure.

FIG. 19B is a diagram illustrating a second example two-way setup procedure according to the present disclosure.

FIG. 20A is a diagram illustrating a first example one-way teardown procedure according to the present disclosure.

FIG. 20B is a diagram illustrating a second example one-way teardown procedure according to the present disclosure.

FIG. 21A is a diagram illustrating a first example one-way setup procedure according to the present disclosure.

FIG. 21B is a diagram illustrating a second example one-way setup procedure according to the present disclosure.

FIG. 22 is a diagram illustrating an example one-way update procedure according to the present disclosure.

FIG. 23 is a diagram illustrating an example two-way update procedure according to the present disclosure.

FIG. 24 is a diagram illustrating another example format of WUR Action field of WUR Action frame according to the present disclosure.

FIG. 25 is a diagram illustrating another example format of Action Type field of WUR Mode element according to the present disclosure.

FIG. 26 is a diagram illustrating another example format of WUR Mode Response Status field of WUR Mode element according to the present disclosure.

DESCRIPTION OF EMBODIMENTS

The present disclosure can be better understood with the aid of following figures and embodiments. The embodiments described here are merely exemplary in nature and are used to describe some of the possible applications and uses of the present disclosure and should not be taken as limiting the present disclosure with regard to alternative embodiments that are not explicitly described herein.

In any wireless communication system, a wide variety of devices may be a part of the wireless network, each device differing in terms of traffic needs, device capabilities, power supply types and so on. Some class of devices may have less bandwidth requirements and also less stringent QoS (Quality of Service) requirements but may be relatively more concerned about power consumption (e.g., mobile phones). Another class of devices may have low bandwidth requirements as well as very low duty cycles but may be very sensitive to power consumption due to extremely small batteries or extremely long life expectancy (e.g., sensors for remote sensing).

In many wireless communication systems, there will be one or more central controllers which will determine the wireless network coverage area, the wireless frequency channels, the device admission policy, coordination with other neighboring wireless networks etc. and usually also act as a gateway to the backend infrastructure network. Examples of the central controllers are base stations or eNBs in cellular wireless networks or APs (Access Points) in WLANs (Wireless Local Area Networks).

Even though the techniques described in the present disclosure may apply to many wireless communication systems, for the sake of example, the rest of the descriptions in this disclosure are described in terms of an IEEE 802.11 based WLAN system and its associated terminologies. This should not be taken as limiting the present disclosure with regard to alternative wireless communication systems. In IEEE 802.11 based WLANs, majority of networks operate in infrastructure mode, i.e., all or most of the traffic in the network need to go through the AP. As such, any STA (station) wishing to join the WLAN must first negotiate the network membership with the AP through a process called association and authentication.

Figure 1:
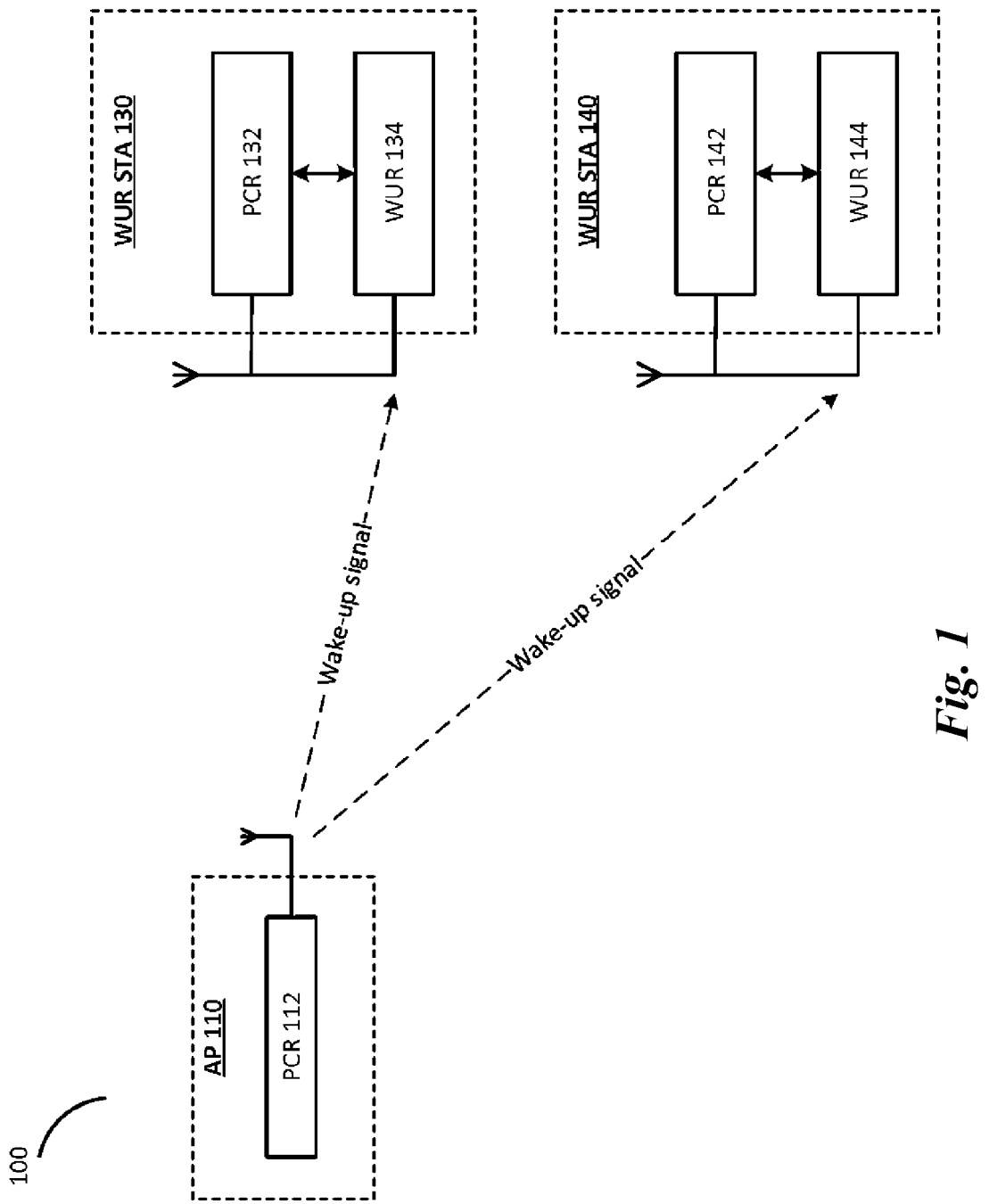
FIG. 1 is a diagram illustrating an example wireless network.

FIG. 1 illustrates an example wireless network 100 including an AP 110 and a plurality of STAs. The AP 110 includes a PCR apparatus (hereinafter stated simply as "PCR") 112. STA 130 represents a device class that may have less bandwidth requirements and also less stringent QoS requirements but may be relatively more concerned about power consumption. STA 140 represents another class of devices that may have low bandwidth requirements but may be very sensitive to power consumption. In order to maximize energy efficiency, the STA 130 is equipped with a WUR apparatus 134 (hereinafter stated simply as "WUR") in addition to a PCR 132 and the STA 140 is equipped with a WUR 144 in addition to a PCR 142. Both the STA 130 and the STA 140 are termed as WUR STAs thereafter.

According to the present disclosure, a WUR STA can operate in either of the two power management modes: active mode and PS (power save) mode. When the STA operates in PS mode, it is in either awake state or doze state. For the STA operating in PS mode, it is in awake state when its PCR is active and thus is able to receive DL (downlink) traffic or transmit UL (uplink) traffic; and it is in doze state when its PCR is not active and thus is not able to transmit UL traffic or receive DL traffic. When the STA operates in active mode, it is always in awake state.

According to the present disclosure, a WUR STA operating in active mode or PS mode can also operate in WUR mode. When the STA operates in both PS mode and WUR mode, it is in either WUR awake state or WUR doze state. For the STA operating in both PS mode and WUR mode, it is in WUR awake state when its PCR is active and its WUR may not be active; and it is in WUR doze state when its PCR is not active and its WUR receiver follows the duty cycle schedule agreed between the AP 110 and the STA. When the STA operates in both active mode and WUR mode, it is always in WUR awake state.

According to the present disclosure, a duty cycle schedule is represented by three parameters: the starting point for the duty cycle schedule, the period of duty cycle, and the on duration in each duty cycle period. The period of duty cycle is a multiple of a WUR basic unit. The on duration in each duty cycle period is larger than or equal to a minimum wake-up duration. Notice that for the STA operating in both PS mode and WUR mode and being in doze state, when the on duration in each duty cycle period is equal to the period of duty cycle, its WUR receiver is always on.

According to the present disclosure, the WUR basic unit can be a multiple of time unit (1024 us) defined in the IEEE Std 802.11™-2016. As a result, the implementation of a WUR STA can be simplified.

According to the present disclosure, the AP 110 shall keep track of the status of the STA operating in both PS mode and WUR mode. In other words, the AP 110 shall record whether the STA operating in both PS mode and WUR mode is in WUR awake state or WUR doze state.

According to the present disclosure, when DL data traffic for the STA in WUR doze state is coming, the AP 110 shall buffer DL data traffic for the STA and then transmit a wake-up frame to the STA, alerting there is buffered DL data traffic for the STA.

First Embodiment

Figure 2:
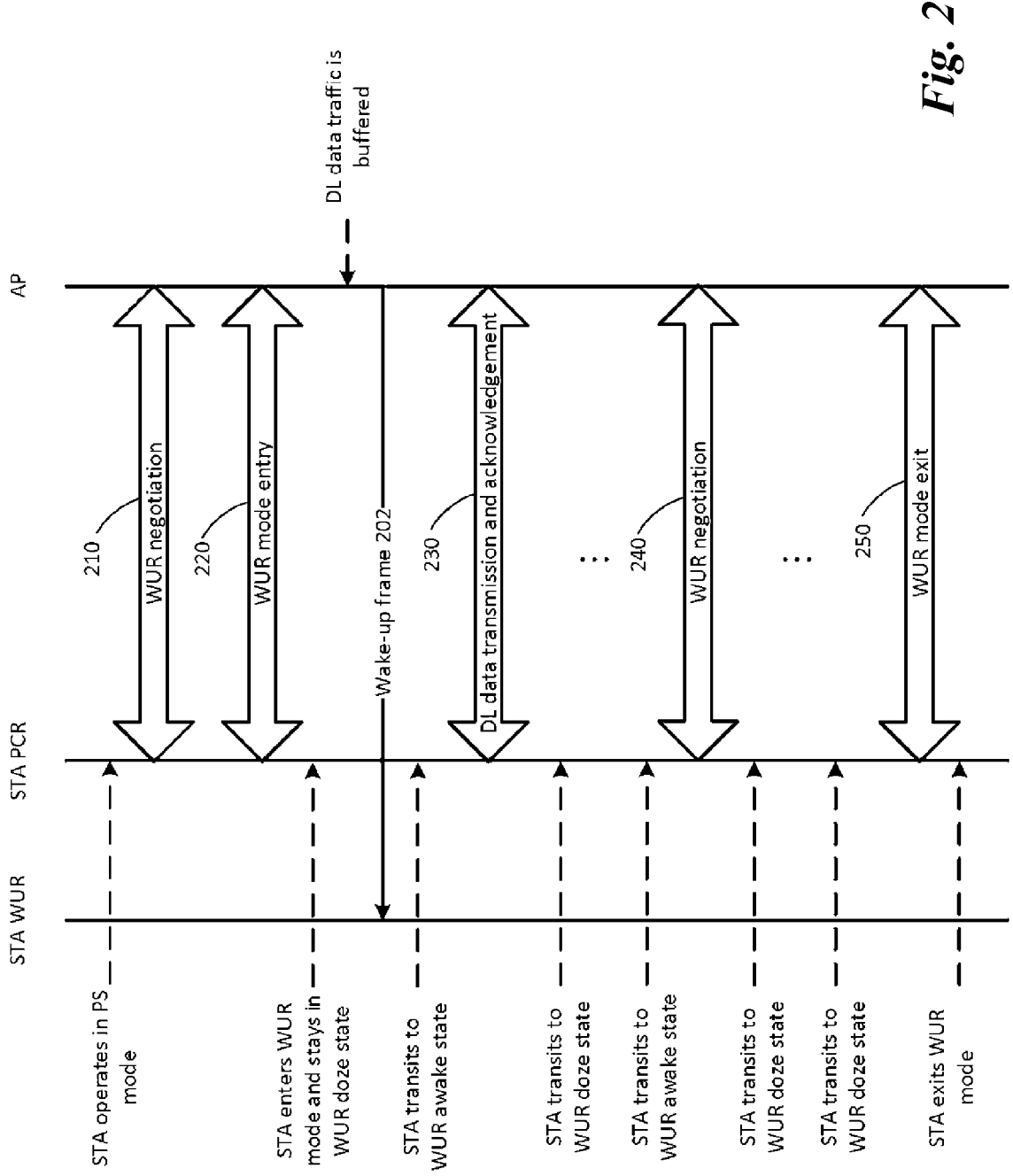
FIG. 2 is a diagram illustrating example WUR mode operation related MAC procedures according to a first embodiment of the present disclosure.

FIG. 2 illustrates example WUR mode operation related MAC procedures operated by a WUR STA (e.g., 130) and the AP 110 according to a first embodiment of the present disclosure. Assume the STA operates in PS mode after it is associated with the AP 110 via an association procedure. Prior to entering WUR mode, the STA shall initiate a WUR negotiation procedure 210 with the AP 110 to negotiate wake-up operating parameters which govern WUR mode operation performed by the STA and the AP 110. The example wake-up operating parameters include WUR channel in which the STA is able to receive a wake-up frame,
STA identifier to be used in a unicast wake-up frame,
Time required for turning on the STA's PCR,
Duty cycle schedule of the STA's WUR receiver,
WUR basic unit,
minimum wake-up duration,
WUR sleep interval,
data rate feedback request and
WUR Beacon interval, etc.

During the WUR negotiation procedure 210, the STA sends a WUR Mode Request frame to the AP 110 which contains requested wake-up operating parameters, and then the AP 110 responds with a WUR Mode Response frame which contains agreed wakeup operating parameters.

After completing wake-up operating parameter negotiation, the STA may initiate a WUR mode entry procedure 220 with the AP 110 for entering WUR mode. During the WUR mode entry procedure 220, the STA transmits a WUR Mode Request frame to the AP 110 with a request for entering WUR mode, and then the AP 110 responds with a WUR Mode Response frame which indicates whether the STA's request for entering WUR mode is accepted or rejected. After receiving the WUR Mode Response frame indicating the request for entering WUR mode is accepted, the STA enters WUR mode and stays in WUR doze state.

According to the first embodiment of the present disclosure, when the WUR of the STA in WUR doze state receives a unicast wake-up frame 202 from the AP 110, it transits to WUR awake state as shown in FIG. 2, and then initiates a DL data transmission and acknowledgement procedure 230 with the AP 110. During the DL data transmission and acknowledgement procedure 230, it may transmit a PS-Poll frame to the AP 110 via its PCR to retrieve buffered traffic and acknowledge successful receipt of the wake-up frame 202. The AP 110 responds to the PS-Poll frame with a buffered Data frame or an ACK frame followed in a separate TXOP (Transmission Opportunity) by a buffered Data frame at the head of transmit queue. If there is more buffered traffic for the STA, the More Data field in the delivered Data frame is set to 1. Otherwise, the More Data field in the delivered Data frame is set to 0. The STA responds with an acknowledgement frame for acknowledging successful receipt of the Data frame. The acknowledgement frame is either an ACK frame or a BlockAck frame. After transmitting the acknowledgement frame which acknowledges successful receipt of the Data frame with the More Data field set to 0, the STA transits to WUR doze state.

According to a first aspect of the present disclosure, the STA may transit to WUR awake state from WUR doze state even if no wake-up frame is received or no UL data traffic is buffered. For one example, when the STA intends to negotiate new wake-up operating parameters (e.g., duty cycle schedule of its WUR receiver) with the AP 110, it transits to WUR awake state from WUR doze state and initiates another WUR negotiation procedure 240 with the AP 110. During the WUR negotiation procedure 240, the STA sends a WUR Mode Request frame to the AP 110 which contains requested wake-up operating parameters, and then the AP 110 responds with a WUR Mode Response frame which contains agreed wake-up operating parameters and indicates when the agreed wake-up operating parameters will take effect. After completing new wake-up operating parameter negotiation, the STA transits to WUR doze state. For another example, when the STA intends to exit WUR mode, it transits to WUR awake state from WUR doze state and initiates a WUR mode exit procedure 250 with the AP 110. During the WUR mode exit procedure 250, the STA sends a WUR Mode Request frame to the AP 110 with a request for exiting WUR mode, and then the AP 110 responds with a WUR Mode Response frame which indicates whether the STA's request for exiting WUR mode is accepted or rejected. After receiving the WUR Mode Response frame indicating the request for exiting WUR mode is accepted, the STA exits WUR mode and operates in PS mode only.

According to the first aspect of the present disclosure, the STA operating in WUR mode is allowed to initiate a WUR negotiation procedure with the AP 110 to negotiate new wake-up operating parameters as illustrated in FIG. 2, with no need of exiting WUR mode. As a result, channel efficiency is maximized.

Figure 10:
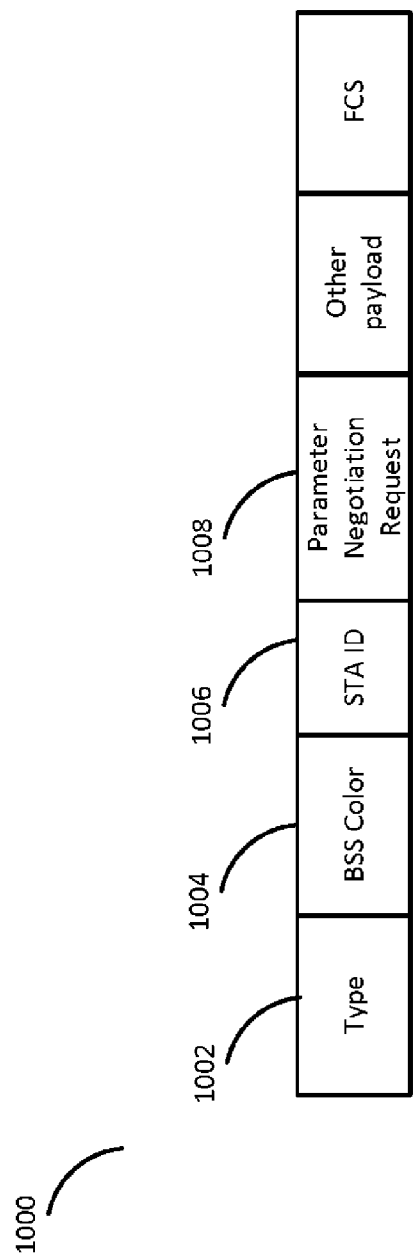
FIG. 10 is a diagram illustrating the example format of wake-up frame according to the present disclosure.

According to the first aspect of the present disclosure, if the AP 110 intends to negotiate new wake-up operating parameters with the STA operating in WUR mode (e.g., WUR channel), it sends a wake-up frame to inform the STA operating in WUR mode that it intends to negotiate new wake-up operating parameters, as illustrated in FIG. 10. After receiving such a wake-up frame, the STA operating in WUR mode initiates a WUR negotiation procedure with the AP 110 to negotiate new wake-up operating parameters, with no need of exiting WUR mode. As a result, channel efficiency is maximized.

According to the present disclosure, one of wake-up operating parameters which can be negotiated during WUR negotiation is so called WUR sleep interval. The WUR sleep interval indicates to the AP 110 how often the STA operating in WUR mode turns on its PCR to receive Beacon frames for the purpose of keeping synchronized with the AP 110. The WUR sleep interval can be much larger than the WNM (Wireless Network Management) sleep interval defined in the IEEE Std 802.11™-2016 since unlike the STA operating in WNM sleep mode, the STA operating in WUR mode need not to wake to receive Beacon frames to check if there is buffered data traffic.

According to the present disclosure, another of wake-up operating parameters which can be negotiated during WUR negotiation is so called data rate feedback request. If the STA supports multiple data rates and data rate feedback, the AP 110 may request the STA to report recommended data rate based on the quality of received wake-up measurement signal transmitted in a WUR channel. As a result, the AP 110 can make an informed decision on the data rate which is used to transmit wake-up signal to the STA in the WUR channel.

Second Embodiment

Figure 3:
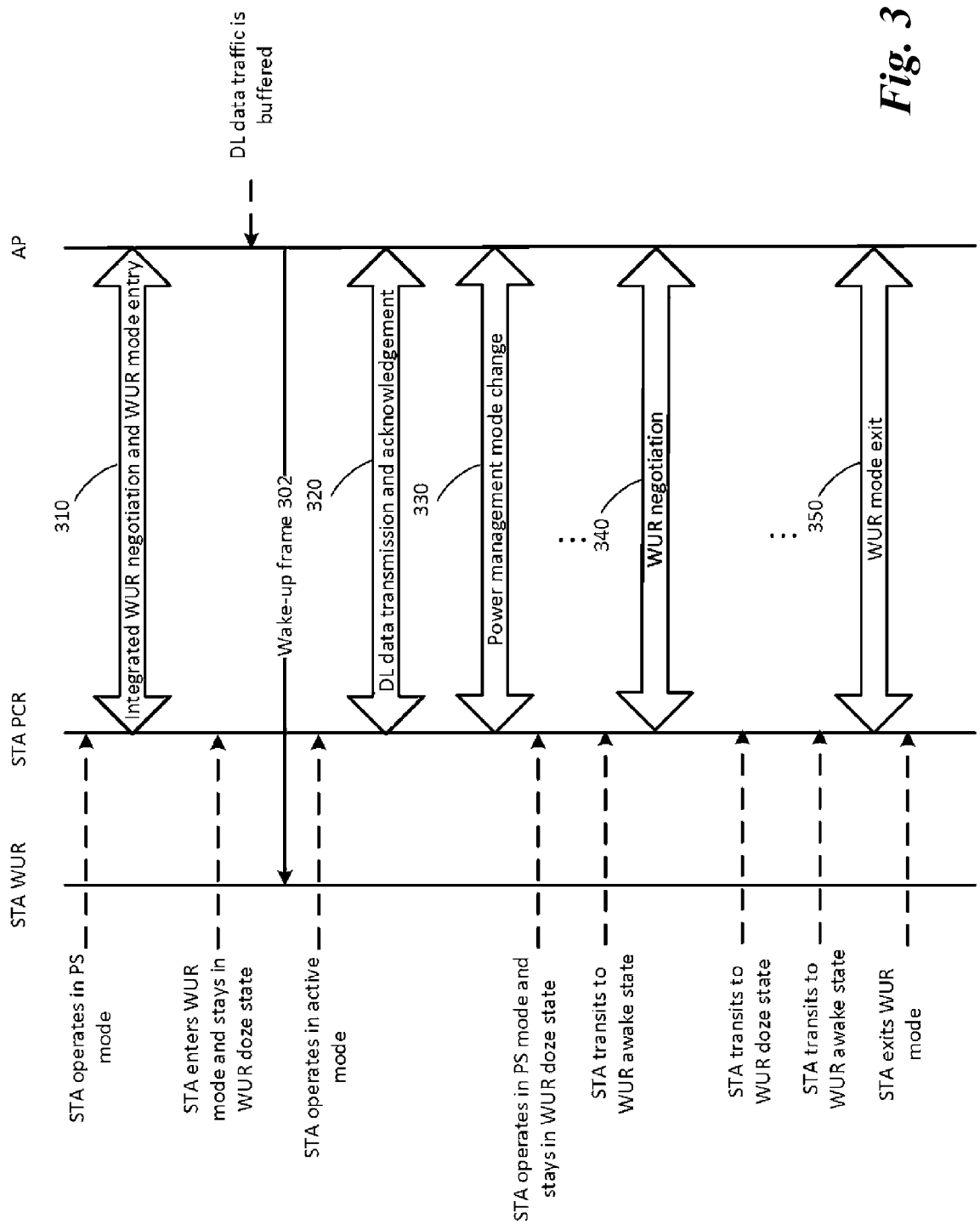
FIG. 3 is a diagram illustrating example WUR mode operation related MAC procedures according to a second embodiment of the present disclosure.

FIG. 3 illustrates example WUR mode operation related MAC procedures operated by a WUR STA and the AP 110 according to a second embodiment of the present disclosure. Assume the STA operates in PS mode after it is associated with the AP 110 via an association procedure. The STA shall initiate an integrated WUR negotiation and WUR mode entry procedure 310 with the AP 110 for negotiating wake-up operating parameters and requesting to enter WUR mode. During the integrated WUR negotiation and WUR mode entry procedure 310, the STA sends a WUR Mode Request frame to the AP 110 which contains requested wake-up operating parameters and a request for entering WUR mode, and then the AP 110 responds with a WUR Mode Response frame which contains agreed wake-up operating parameters and indicates whether the STA's request for entering WUR mode is accepted or rejected. After receiving the WUR Mode Response frame indicating the request for entering WUR mode is accepted, the STA enters WUR mode and stays in WUR doze state.

According to the second embodiment of present disclosure, the integrated WUR negotiation and WUR mode entry procedure 310 implements the same functionality as the WUR negotiation procedure 210 and the WUR mode entry procedure 220. As a result, the second embodiment has better channel efficiency than the first embodiment.

According to the second embodiment of present disclosure, when the WUR receiver of the STA in WUR doze state receives a unicast wake-up frame 302 from the AP 110, it changes its power management mode to active mode as shown in FIG. 3, and then initiate a DL data transmission and acknowledgement procedure 320 with the AP 110. During the DL data transmission and acknowledgement procedure 320, it may transmit a QoS Null frame with the Power Management subfield set to 0 to the AP 110 via its PCR to retrieve buffered traffic and acknowledge successful receipt of the wake-up frame 302. The AP 110 responds to the QoS Null frame with an ACK frame, followed by a buffered Data frame at the head of transmit queue. If there is more buffered traffic for the STA, the More Data field in the delivered Data frame is set to 1. Otherwise, the More Data field in the delivered Data frame is set to 0. The STA responds with an acknowledgement frame for acknowledging successful receipt of the Data frame. The acknowledgement frame is either an ACK frame or a BlockAck frame.

After transmitting the acknowledgement frame which acknowledges successful receipt of the Data frame with the More Data field set to 0, the STA may initiate a power management mode change procedure 330 for changing back to PS mode. During the power management mode change procedure 330, the STA sends a QoS Null frame with the Power Management subfield set to 1 to the AP 110, and then the AP 110 responds with an ACK frame. After receiving the ACK frame, the STA transits to operate in PS mode and stays in WUR doze state.

According to the first aspect of the present disclosure, the STA may transit to WUR awake state from WUR doze state even if no wake-up frame is received or no UL data traffic is buffered. For one example, when the STA intends to negotiate new wake-up operating parameters (e.g., duty cycle schedule of its WUR receiver) with the AP 110, it transits to WUR awake state from WUR doze state and initiates another WUR negotiation procedure 340 with the AP 110. During the WUR negotiation procedure 340, the STA sends a WUR Mode Request frame to the AP 110 which contains requested wake-up operating parameters, and then the AP 110 responds with a WUR Mode Response frame which contains agreed wake-up operating parameters and indicates when the agreed wake-up operating parameters will take effect. After completing new wake-up operating parameter negotiation, the STA transits to WUR doze state. For another example, when the STA intends to exit WUR mode, it transits to WUR awake state from WUR doze state and initiates a WUR mode exit procedure 350 with the AP 110. During the WUR mode exit procedure 350, the STA sends a WUR Mode Request frame to the AP 110 with a request for exiting WUR mode, and then the AP 110 responds with a WUR Mode Response frame which indicates whether the STA's request for exiting WUR mode is accepted or rejected. After receiving the WUR Mode Response frame indicating the request for exiting WUR mode is accepted, the STA exits WUR mode and operates in PS mode only.

According to the first aspect of present disclosure, the STA operating in WUR mode is allowed to initiate a WUR negotiation procedure with the AP 110 to negotiate new wake-up operating parameters as illustrated in FIG. 3, with no need of exiting WUR mode. As a result, channel efficiency is maximized.

According to the first aspect of the present disclosure, if the AP 110 intends to negotiate new wake-up operating parameters with the STA operating in WUR mode, it sends a wake-up frame to inform the STA operating in WUR mode that it intends to negotiate new wake-up operating parameters, as illustrated in FIG. 10. After receiving such a wake-up frame, the STA operating in WUR mode initiates a WUR negotiation procedure with the AP 110 to negotiate new wake-up operating parameters, with no need of exiting WUR mode. As a result, channel efficiency is maximized.

Figure 11:
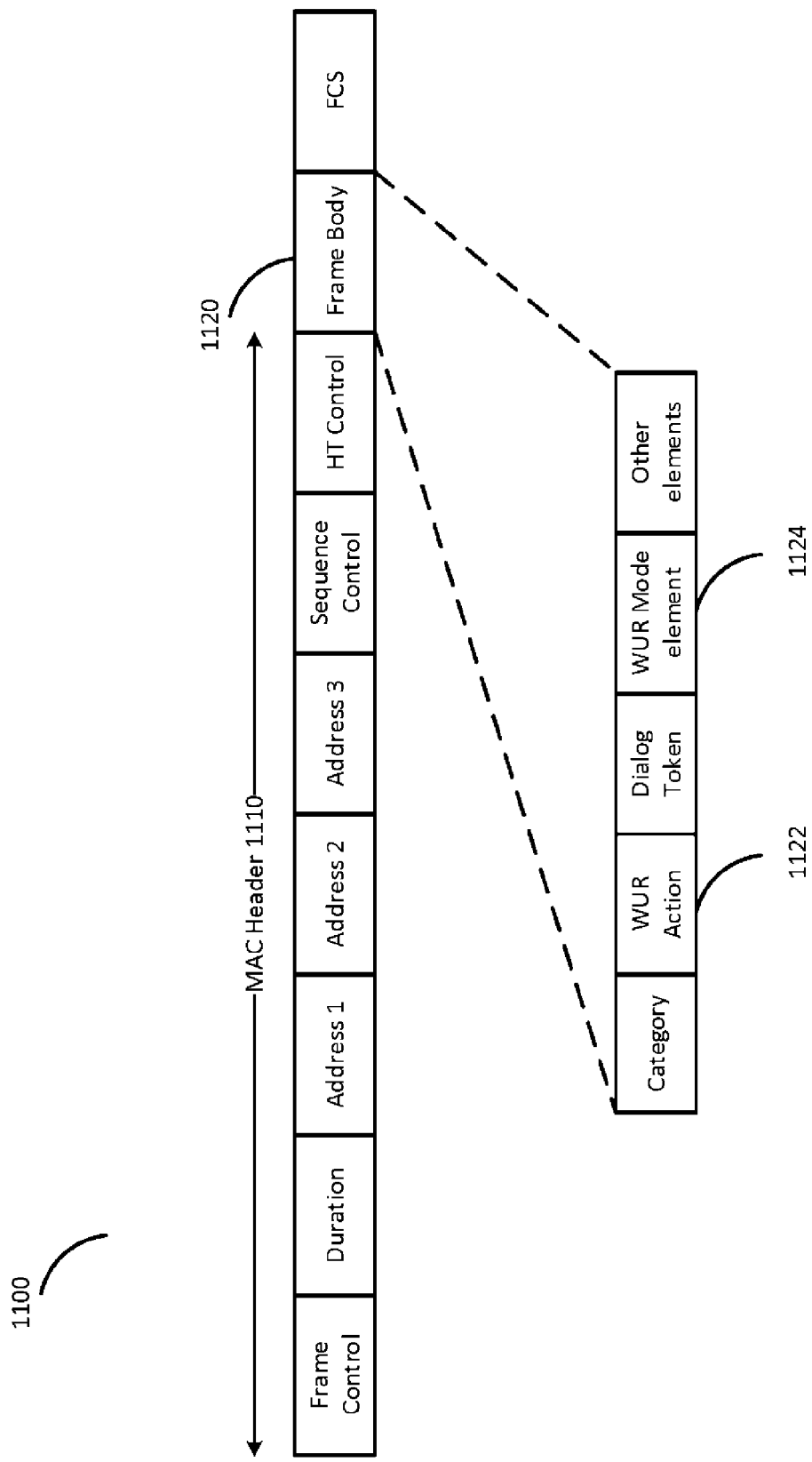
FIG. 11 is a diagram illustrating the example format of WUR Action frame according to the present disclosure.
Figure 12:
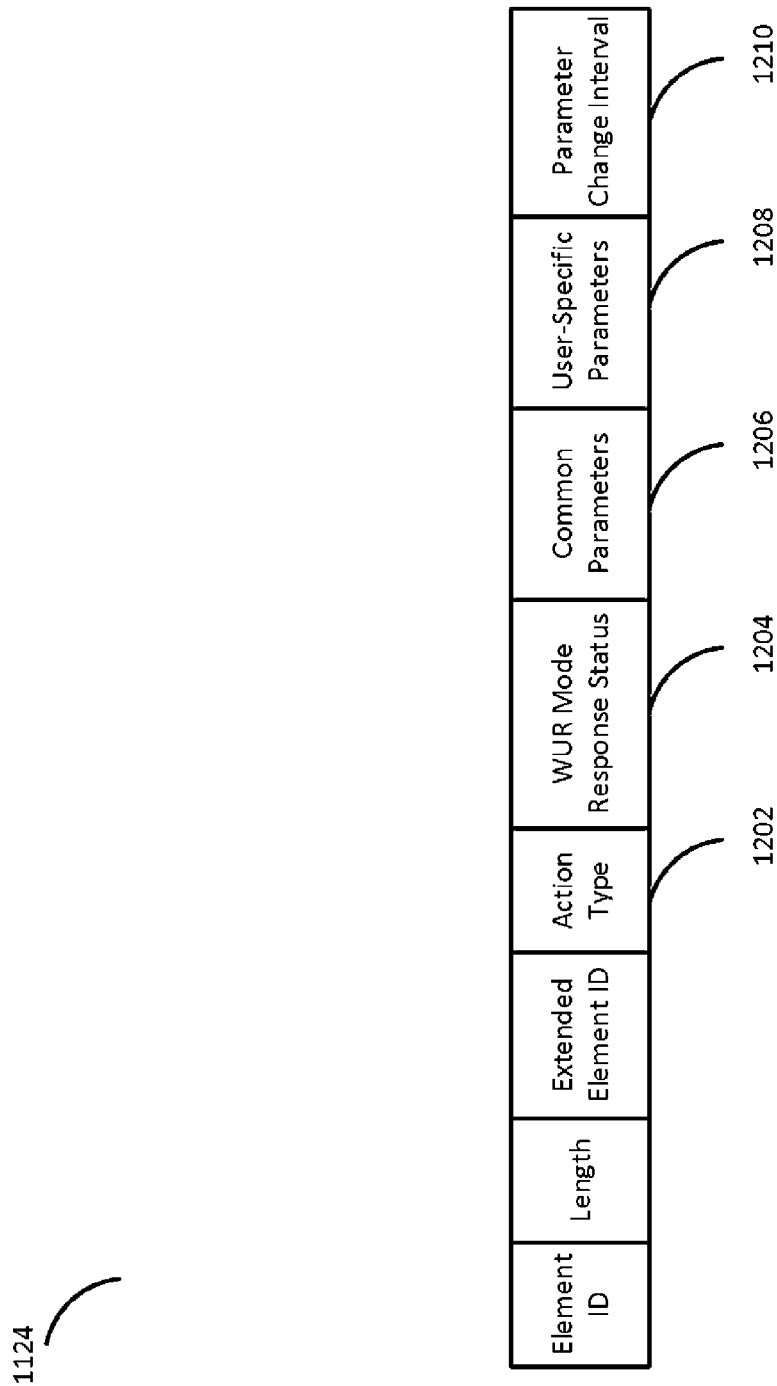
FIG. 12 is a diagram illustrating the example format of WUR Mode element according to the first aspect of the present disclosure.

According to the first aspect of the present disclosure, all wake-up operating parameters can be carried in a WUR Mode element, as illustrated in FIG. 12. The WUR Mode element can be included in a WUR Action frame as illustrated in FIG. 11, e.g., WUR Mode Request frame or WUR Mode Response frame.

Figure 4:
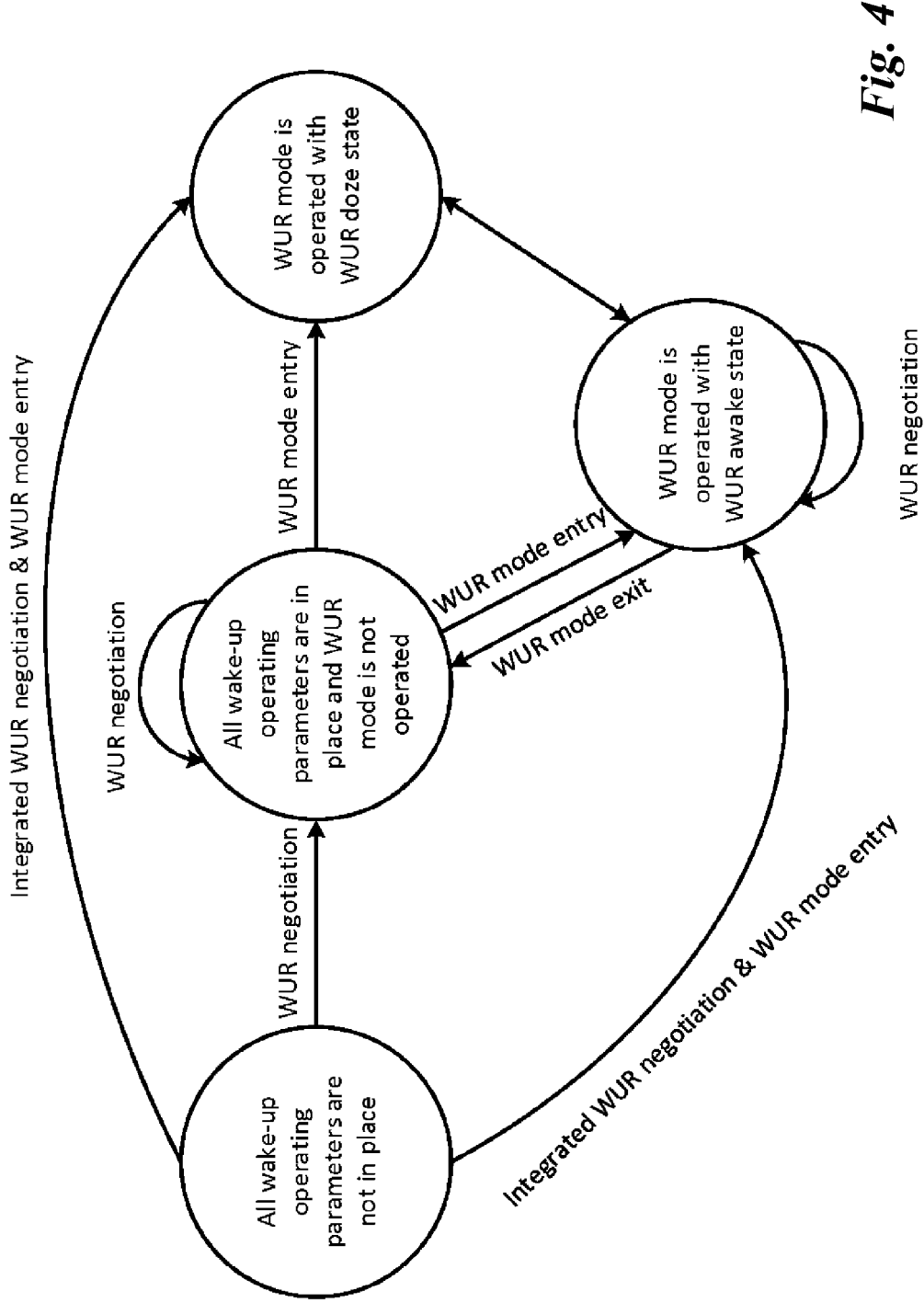
FIG. 4 is a diagram illustrating WUR mode operation related state transition for a wireless communication device according to a first aspect of the present disclosure.

FIG. 4 illustrates WUR mode operation related state transition for the STA according to the first aspect of the present disclosure. The STA may have four states related to WUR mode operation. In a first state, all wake-up operating parameters are not in place. In a second state, all wake-up operating parameters are in place but WUR mode is not operated. In a third state, WUR mode is operated with WUR doze state. In a fourth state, WUR mode is operated with WUR awake state. As illustrated in FIG. 4, the STA staying in the first state can transit to the second state after a WUR negotiation procedure is completed, transit to the third state after an integrated WUR negotiation and WUR mode entry procedure is completed and if the STA also operates in PS mode, or transit to the fourth state after an integrated WUR negotiation and WUR mode entry procedure is completed and if the STA also operates in active mode. The STA staying in the second state can transit to the third state after a WUR mode entry procedure is completed and if the STA also operates in PS mode, transit to the fourth state after a WUR mode entry procedure is completed and if the STA also operates in active mode, or update wake-up operating parameters after a WUR negotiation procedure is completed. The STA staying in the third state can transit to the fourth state for various reasons, e.g., when UL data traffic is buffered, or when a wake-up frame is received. The STA staying in the fourth state can transit to the second state after a WUR mode exit procedure is completed, or update wake-up operating parameters after a WUR negotiation procedure is completed. The STA staying in the fourth state can transit to the third state for various reasons, e.g., after transmitting an acknowledgement frame for acknowledging a DL Data frame with the More Data field set to 0, or receiving an acknowledgement frame which acknowledges an UL Data frame with the More Data field set to 0.

According to a second aspect of the present disclosure, wake-up operating parameters are classified into two categories: common wake-up operating parameters and user-specific wake-up operating parameters. The common wake-up operating parameters are applicable to all WUR STAs in the wireless network 100. The userspecific wake-up operating parameter are only applicable to a particular WUR STA in the wireless network 100. Example common wake-up operating parameters include WUR Beacon interval, WUR basic unit, and minimum wake-up duration, etc.

Example user-specific wake-up operating parameters include

WUR channel in which the STA is able to receive a wake-up frame,

STA identifier to be used in a unicast wake-up frame, duty cycle schedule of the STA's WUR receiver, WUR sleep interval, and data rate feedback request, etc.

According to the second aspect of the present disclosure, common wake-up operating parameters can be carried in a WUR Operation element, as illustrated in FIG. 15. The WUR Operation element can be included in a Beacon frame, an Association Response frame, an Reassociation Response frame or a Probe Response frame. The formats of the Beacon frame, the Association Response frame, the Reassociation Response frame and the Probe Response frame are defined in the IEEE Std 802.11™-2016.

Figure 14:
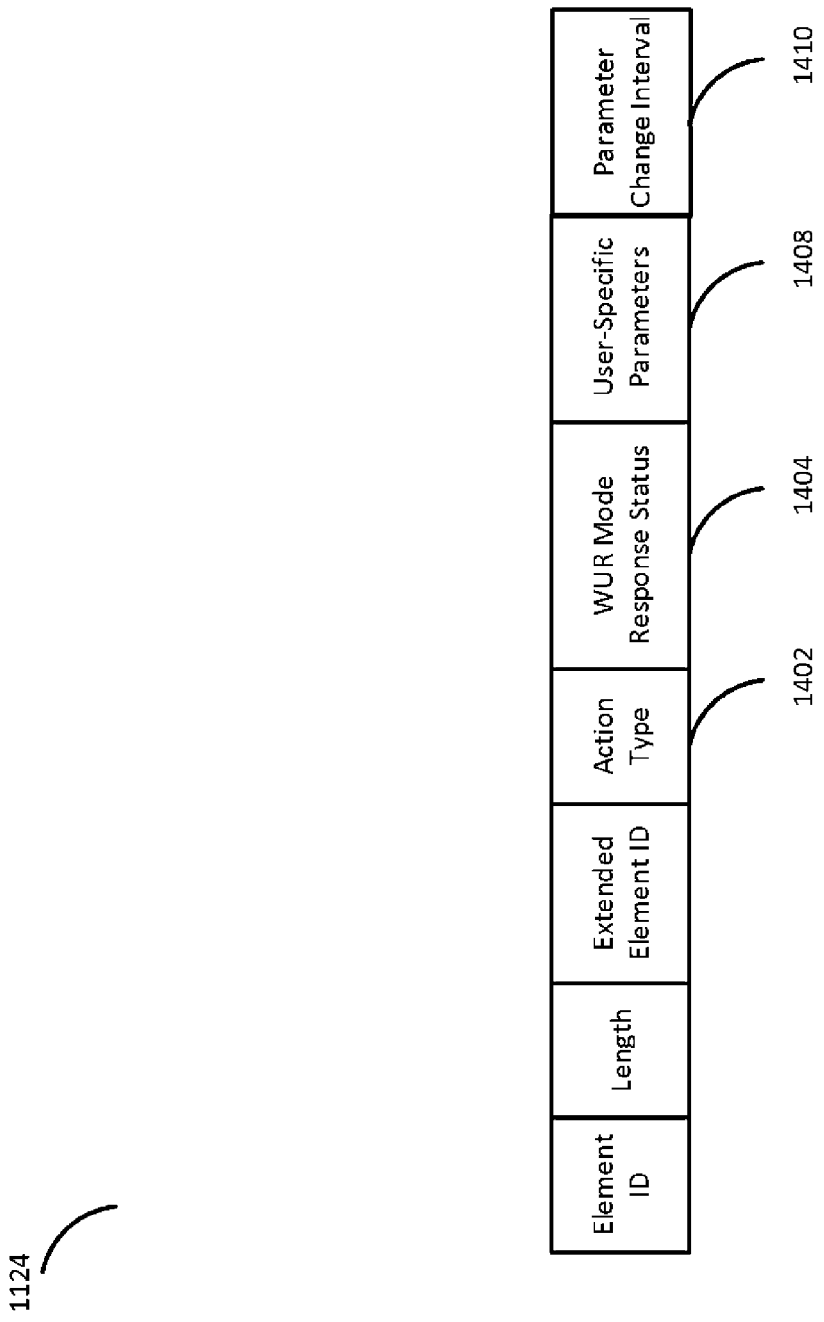
FIG. 14 is a diagram illustrating the example format of WUR Mode element according to the second aspect of the present disclosure.

According to the second aspect of the present disclosure, user-specific wake-up operating parameters can be carried in a WUR Mode element, as illustrated in FIG. 14. The WUR Mode element can be included in a WUR Action frame as illustrated in FIG. 11 (e.g., WUR Mode Request frame or WUR Mode Response frame), an Association Response frame or a Reassociation Response frame.

According to the second aspect of the present disclosure, common wake-up operating parameters can be obtained by the STA from the AP 110 via a synchronization procedure and/or an association procedure. User-specific wake-up operating parameters are negotiated between the STA and the AP 110 via a WUR negotiation procedure, an integrated WUR negotiation and WUR mode entry procedure, or an association procedure incorporating WUR negotiation. Since common wake-up operating parameters do not change as frequently as user-specific wake-up operating parameters, channel efficiency is maximized.

Third Embodiment

Figure 5:
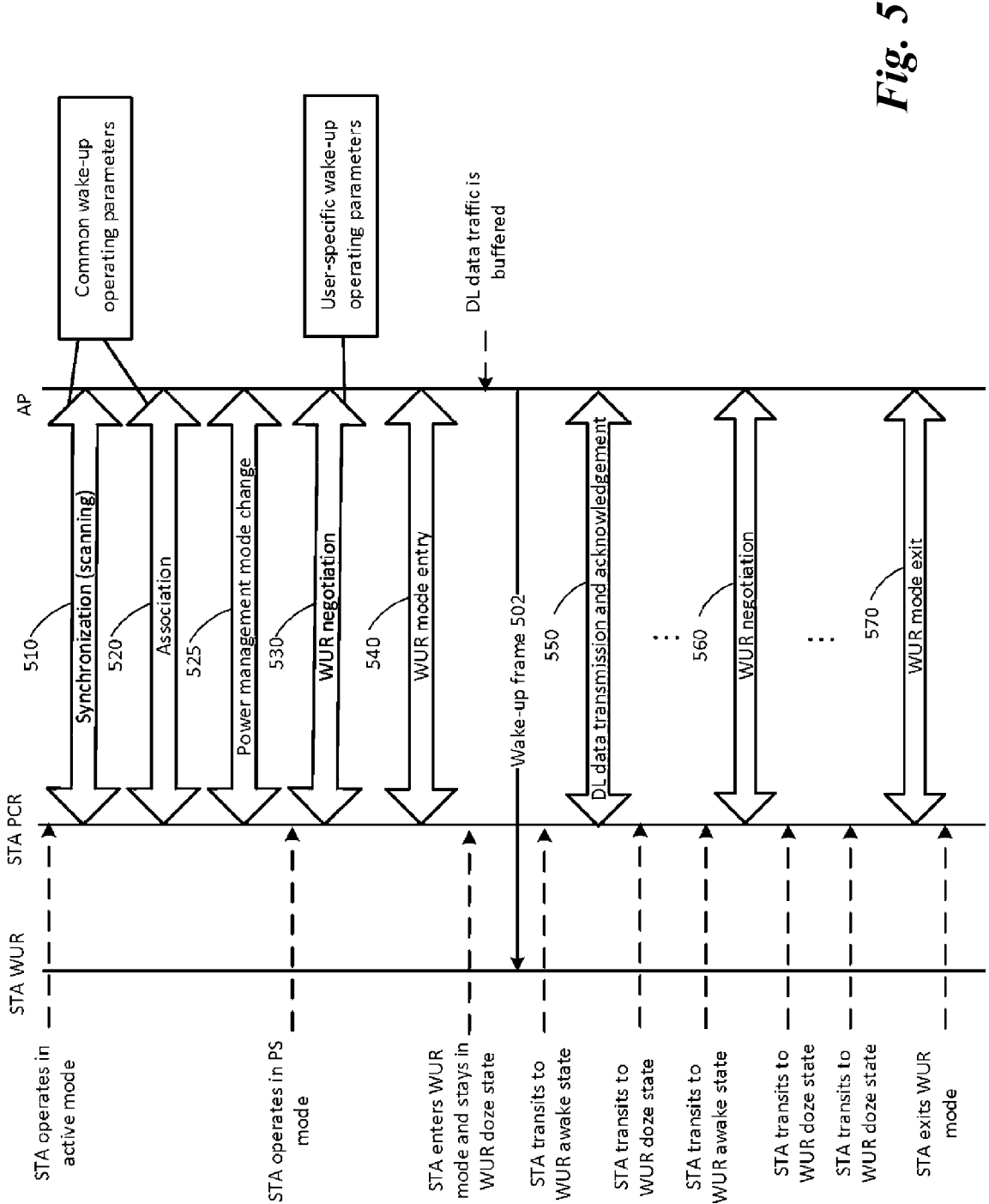
FIG. 5 is a diagram illustrating example WUR mode operation related MAC procedures according to a third embodiment of the present disclosure.

FIG. 5 illustrates example WUR mode operation related MAC procedures operated by a WUR STA and the AP 110 according to a third embodiment of the present disclosure. Before the STA is associated with the AP 110, it shall operate in active mode and initiate a synchronization procedure 510 to acquire synchronization with the AP 110 via passive scanning or active scanning During the synchronization procedure 510, if active scanning is performed, the STA sends a Probe Request frame to the AP 110, which may contain WUR capability information of the STA (e.g., time required for turning on its PCR and support of data rate feedback). And then the AP 110 responds with a Probe Response frame which contains common wake-up operating parameters as well as necessary synchronization information (e.g., TSF (Time Synchronization Function) timer). The Probe Response frame may contain WUR capability information of the AP 110 (e.g., support of frequency domain multiplexing transmission for multiple wake-up frames). If passive scanning is performed, the STA receives a Beacon frame from the AP 110 which contain common wake-up operating parameters as well as necessary synchronization information. The Beacon frame may contain WUR capability information of the AP 110.

After the STA gets synchronized with the AP 110 via the synchronization procedure 520, it may initiate an association procedure 520 with the AP 110. During the association procedure 520, the STA sends an Association Request frame or a Reassociation Request frame to the AP 110, which may contain WUR capability in-formation of the STA. And then the AP 110 responds with an Association Response frame or a Reassociation Response frame which may contain common wake-up operating parameters and WUR capability information of the AP 110.

The STA may initiate a power management mode change procedure 525 for changing its power management mode to PS mode after it is associated with the AP 110 via the association procedure 520 with the AP 110. During the power management mode change procedure 525, the STA may transmit a QoS Null frame with the Power Management subfield set to 1 to the AP 110; and the AP 110 will respond with an ACK frame. After receiving the ACK frame, the STA transits to operate in PS mode. After that, the STA may initiate a WUR negotiation procedure 530 with the AP 110 to negotiate user-specific wake-up operating parameters. During the WUR negotiation procedure 530, the STA sends a WUR Mode Request frame to the AP 110 which contains requested user-specific wake-up operating parameters, and then the AP 110 responds with a WUR Mode Response frame which contains agreed user-specific wake-up operating parameters. After completing user-specific wake-up operating parameter negotiation, the STA may initiate a WUR mode entry procedure 540 with the AP 110. During the WUR mode entry procedure 540, the STA transmit a WUR Mode Request frame to the AP 110 with a request for entering WUR mode, and then the AP 110 responds with a WUR Mode Response frame which indicates whether the STA's request for entering WUR mode is accepted or rejected. After receiving the WUR Mode Response frame indicating the request for entering WUR mode is accepted, the STA enters WUR mode and stays in WUR doze state.

According to the third embodiment of the present disclosure, when the WUR of the STA staying in WUR doze state receives a unicast wake-up frame 502 from the AP 110, it transits to WUR awake state as shown in FIG. 5, and then initiates a DL data transmission and acknowledgement procedure 550 with the AP 110. During the DL data transmission and acknowledgement procedure 550, it may transmit a PS-Poll frame to the AP 110 via its PCR to retrieve buffered traffic and acknowledge successful receipt of the wake-up frame 502. The AP 110 responds to the PS-Poll frame with a buffered Data frame or an ACK frame followed in a separate TXOP by a buffered Data frame at the head of transmit queue. If there is more buffered traffic for the STA, the More Data field in the delivered Data frame is set to 1. Otherwise, the More Data field in the delivered Data frame is set to 0. The STA responds with an acknowledgement frame for acknowledging successful receipt of the Data frame. The acknowledgement frame is either an ACK frame or a BlockAck frame. After transmitting the acknowledgement frame which acknowledges successful receipt of the Data frame with the More Data field set to 0, the STA transits to WUR doze state.

According to the second aspect of the present disclosure, the STA may transit to WUR awake state from WUR doze state even if no wake-up frame is received or no UL data traffic is buffered. For one example, when the STA intends to negotiate new user-specific wake-up operating parameters (e.g., duty cycle schedule of its WUR receiver) with the AP 110, it transits to WUR awake state from WUR doze state and initiates another WUR negotiation procedure 560 with the AP 110. During the WUR negotiation procedure 560, the STA sends a WUR Mode Request frame to the AP 110 which contains requested user-specific wake-up operating parameters, and then the AP 110 responds with a WUR Mode Response frame which contains agreed user-specific wake-up operating parameters and indicates when the agreed wake-up operating parameters will take effect. After completing new user-specific wake-up operating parameter negotiation, the STA transits to WUR doze state. For another example, when the STA intends to exit WUR mode, it transits to WUR awake state from WUR doze state and initiates a WUR mode exit procedure 570 with the AP 110. During the WUR mode exit procedure 570, the STA sends a WUR Mode Request frame to the AP 110 with a request for exiting WUR mode, and then the AP 110 responds with a WUR Mode Response frame which indicates whether the STA's request for exiting WUR mode is accepted or rejected. After receiving the WUR Mode Response frame indicating the request for exiting WUR mode is accepted, the STA exits WUR mode and operates in PS mode only.

According to the second aspect of the present disclosure, the STA operating in WUR mode is allowed to initiate a WUR negotiation procedure with the AP 110 to negotiate new user-specific wake-up operating parameters as illustrated in FIG. 5, with no need of exiting WUR mode. As a result, channel efficiency is maximized.

According to the second aspect of present disclosure, if the AP 110 intends to negotiate new user-specific wake-up operating parameters with the STA operating in WUR mode, it sends a wake-up frame to inform the STA operating in WUR mode that it intends to negotiate new user-specific wake-up operating parameters, as illustrated in FIG. 10. After receiving such a wake-up frame, the STA operating in WUR mode initiates a WUR negotiation procedure with the AP 110 to negotiate new user-specific wake-up operating parameters, with no need of exiting WUR mode. As a result, channel efficiency is maximized.

Fourth Embodiment

Figure 6:
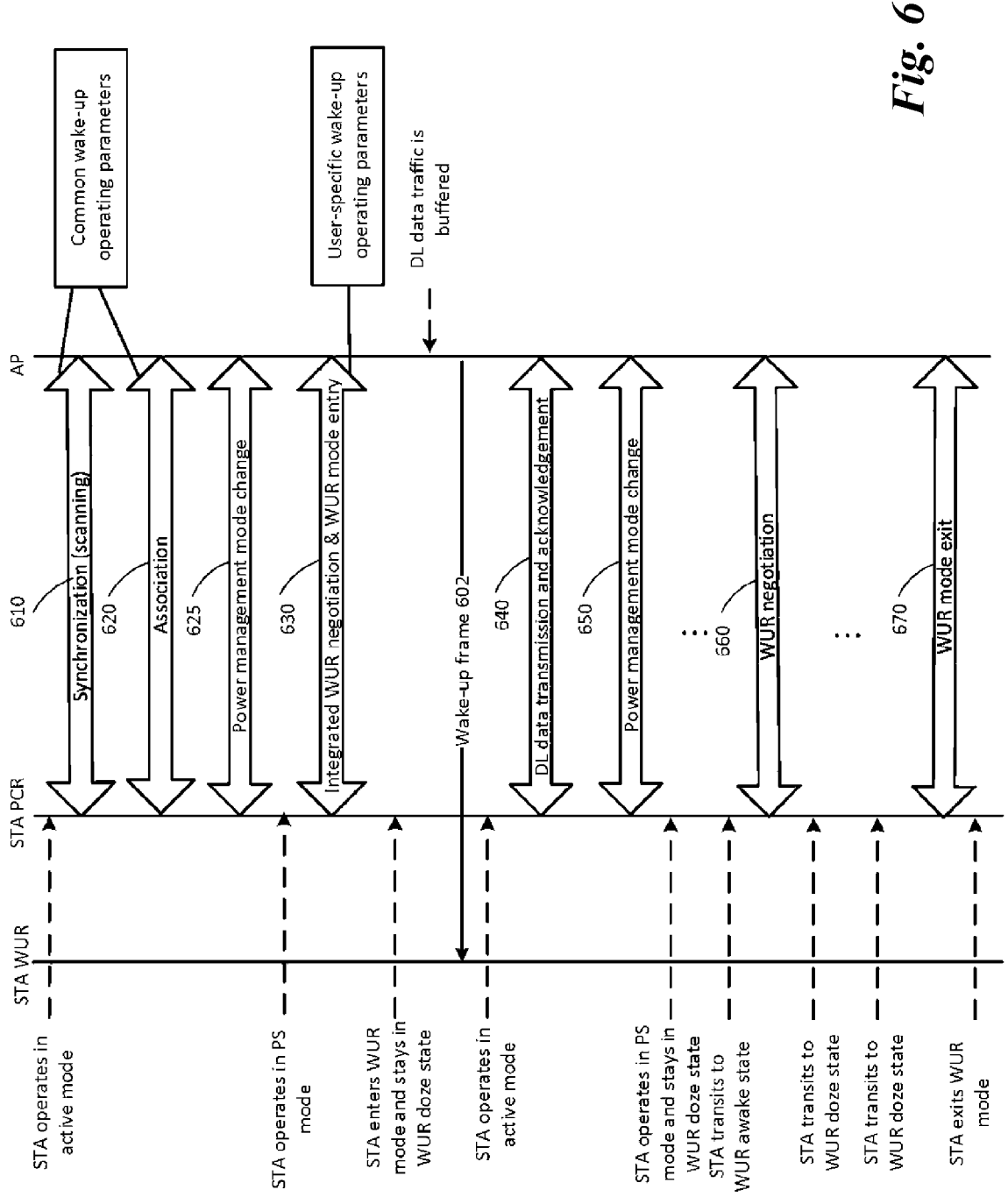
FIG. 6 is a diagram illustrating example WUR mode operation related MAC procedures according to a fourth embodiment of the present disclosure.

FIG. 6 illustrates example WUR mode operation related MAC procedures operated by a WUR STA and the AP 110 according to a fourth embodiment of the present disclosure. Before the STA is associated with the AP 110, it shall operate in active mode and initiate a synchronization procedure 610 to acquire synchronization with the AP 110 via passive scanning or active scanning During the synchronization procedure 610, if active scanning is performed, the STA sends a Probe Request frame to the AP 110 which may contain WUR capability information of the STA. And then the AP 110 responds with a Probe Response frame which contains common wake-up operating parameters as well as necessary synchronization information. The Probe Response frame may contain WUR capability information of the AP 110. If passive scanning is performed, the STA receives a Beacon frame from the AP 110 which contain common wake-up operating parameters as well as necessary synchronization information. The Beacon frame may contain WUR capability information of the AP 110.

After the STA gets synchronized with the AP 110 via the synchronization procedure 620, it may initiate an association procedure 620 with the AP 110. During the association procedure 620, the STA sends an Association Request frame or a Reassociation Request frame to the AP 110, which may contain WUR capability information of the STA. And then the AP 110 responds with an Association Response frame or a Reassociation Response frame which may contain common wake-up operating parameters and WUR capability information of the AP 110.

The STA may initiate a power management mode change procedure 625 for changing its power management mode to PS mode after it is associated with the AP 110 via the association procedure 620 with the AP 110. During the power management mode change procedure 625, the STA may transmit a QoS Null frame with the Power Management subfield set to 1 to the AP 110; and the AP 110 will respond with an ACK frame. After receiving the ACK frame, the STA transits to operate in PS mode. After that, the STA may initiate an integrated WUR negotiation and WUR mode entry procedure 630 with the AP 110 for negotiating user-specific wake-up operating parameters and requesting to enter WUR mode. During the integrated WUR negotiation and WUR mode entry procedure 630, the STA sends a WUR Mode Request frame to the AP 110 which contains requested user-specific wake-up operating parameters and a request for entering WUR mode, and then the AP 110 responds with a WUR Mode Response frame which contains agreed user-specific wake-up operating parameters and indicates whether the STA's request for entering WUR mode is accepted or rejected. After receiving the WUR Mode Response frame indicating the request for entering WUR mode is accepted, the STA enters WUR mode and stays in WUR doze state.

According to the fourth embodiment of present disclosure, the integrated WUR negotiation and WUR mode entry procedure 630 implements the same functionality as the WUR negotiation procedure 530 and the WUR mode entry procedure 540 in the third embodiment. As a result, the fourth embodiment has better channel efficiency than the third embodiment.

According to the fourth embodiment of the present disclosure, when the WUR receiver of the STA staying in WUR doze state receives a unicast wake-up frame 602 from the AP 110, it may change its power management mode to active mode from PS mode as shown in FIG. 6, and then initiate a DL data transmission and acknowledgement procedure 640 with the AP 110. During the DL data transmission and acknowledgement procedure 640, it may transmit a QoS Null frame with the Power Management subfield set to 0 to the AP 110 via its PCR to retrieve buffered traffic and acknowledge successful receipt of the wake-up frame 602. The AP 110 responds to the QoS Null frame with an ACK frame, followed by a buffered Data frame at the head of transmit queue. If there is more buffered traffic for the STA, the More Data field in the delivered Data frame is set to 1. Otherwise, the More Data field in the delivered Data frame is set to 0. The STA responds with an acknowledgement frame for acknowledging successful receipt of the Data frame. The acknowledgement frame is either an ACK frame or a BlockAck frame.

After transmitting the acknowledgement frame which acknowledges successful receipt of the Data frame with the More Data field set to 0, the STA may initiate a power management mode change procedure 650 for changing back to PS mode. During the power management mode change procedure 650, the STA sends a QoS Null frame with the Power Management subfield set to 1 to the AP 110, and then the AP 110 responds with an ACK frame. After receiving the ACK frame, the STA transits to operate in PS mode and stays in WUR doze state.

According to the second aspect of the present disclosure, the STA may transit to WUR awake state from WUR doze state even if no wake-up frame is received or no UL data traffic is buffered. For one example, when the STA intends to negotiate new user-specific wake-up operating parameters (e.g., duty cycle schedule of its WUR receiver) with the AP 110, it transits to WUR awake state from WUR doze state and initiates another WUR negotiation procedure 660 with the AP 110. During the WUR negotiation procedure 660, the STA sends a WUR Mode Request frame to the AP 110 which contains requested user-specific wake-up operating parameters, and then the AP 110 responds with a WUR Mode Response frame which contains agreed user-specific wake-up operating parameters and indicates when the agreed user-specific wake-up operating parameters will take effect. After completing new user-specific wake-up operating parameter negotiation, the STA transits to WUR doze state. For another example, when the STA intends to exit WUR mode, it transits to WUR awake state from WUR doze state and initiates a WUR mode exit procedure 670 with the AP 110. During the WUR mode exit procedure 670, the STA sends a WUR Mode Request frame to the AP 110 with a request for exiting WUR mode, and then the AP 110 responds with a WUR Mode Response frame which indicates whether the STA's request for exiting WUR mode is accepted or rejected. After receiving the WUR Mode Response frame indicating the request for exiting WUR mode is accepted, the STA exits WUR mode and operates in PS mode only.

According to the second aspect of the present disclosure, the STA operating in WUR mode is allowed to initiate a WUR negotiation procedure with the AP 110 to negotiate new user-specific wake-up operating parameters as illustrated in FIG. 6, with no need of exiting WUR mode. As a result, channel efficiency is maximized.

According to the second aspect of the present disclosure, if the AP 110 intends to negotiate new user-specific wake-up operating parameters with the STA operating in WUR mode, it sends a wake-up frame to inform the STA operating in WUR mode that it intends to negotiate new user-specific wake-up operating parameters, as illustrated in FIG. 10. After receiving such a wake-up frame, the STA operating in WUR mode initiates a WUR negotiation procedure with the AP 110 to negotiate new user-specific wake-up operating parameters, with no need of exiting WUR mode. As a result, channel efficiency is maximized.

Fifth Embodiment

Figure 7:
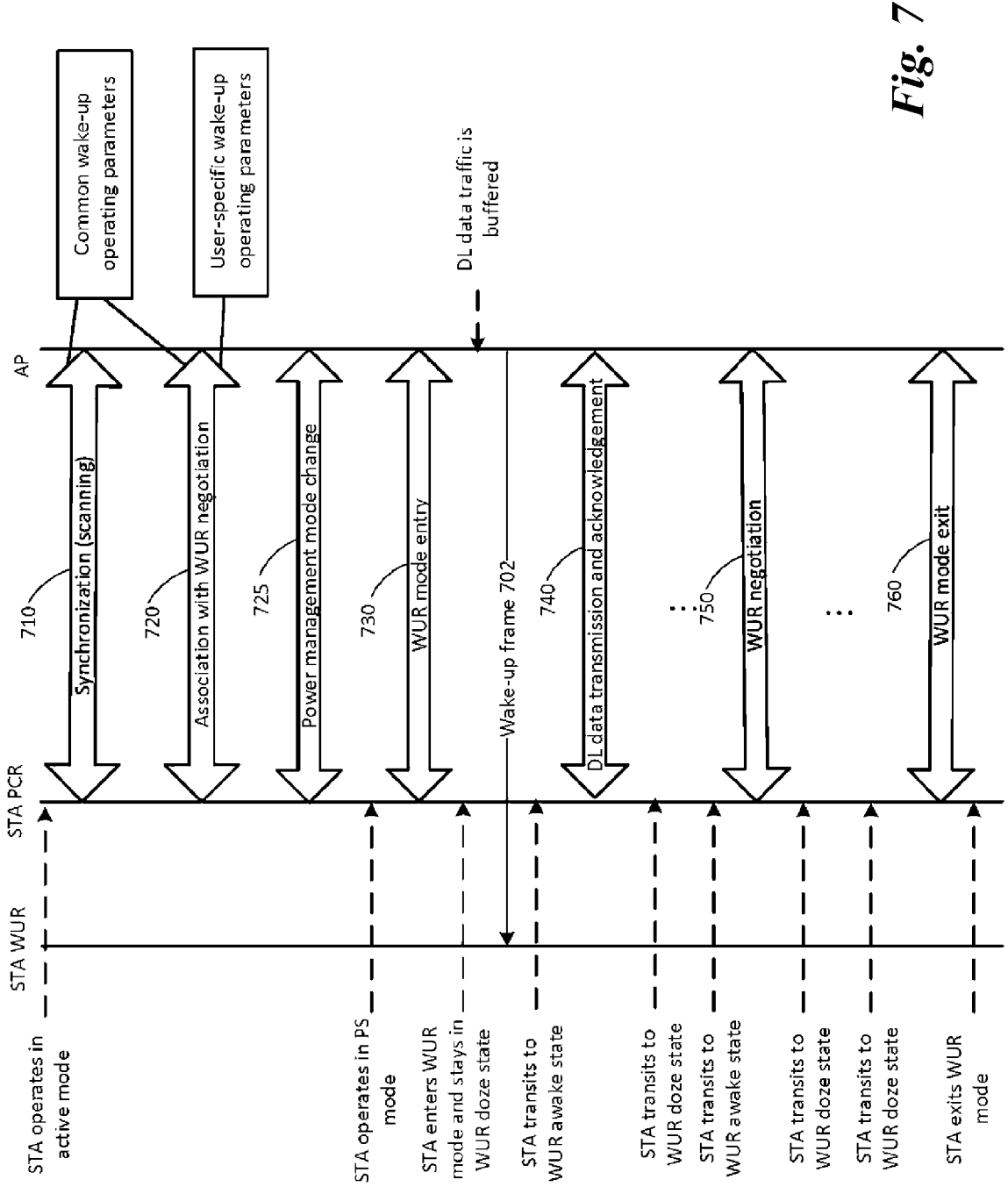
FIG. 7 is a diagram illustrating example WUR mode operation related MAC procedures according to a fifth embodiment of the present disclosure.

FIG. 7 illustrates example WUR mode operation related MAC procedures operated by a WUR STA and the AP 110 according to a fifth embodiment of the present disclosure. Before the STA is associated with the AP 110, it shall operate in active mode and initiate a synchronization procedure 710 to acquire synchronization with the AP 110 via passive scanning or active scanning During the synchronization procedure 710, if active scanning is performed, the STA sends a Probe Request frame to the AP 110, which contains WUR capability information of the STA. And then the AP 110 responds with a Probe Response frame which contains common wake-up operating parameters as well as necessary synchronization information. The Probe Response frame also contains WUR capability information of the AP 110. If passive scanning is performed, the STA receives a Beacon frame from the AP 110 which contain common wake-up operating parameters as well as necessary synchronization information. The Beacon frame also contains WUR capability information of the AP 110.

After the STA gets synchronized with the AP 110 via the synchronization procedure 710, it may initiate an association procedure 720 with the AP 110, which incorporates WUR negotiation. During the association procedure 720, the STA sends an Association Request frame or a Reassociation Request frame to the AP 110, which contains requested user-specific wake-up operating parameters. And then the AP 110 responds with an Association Response frame or a Reassociation Response frame, which contains agreed user-specific wake-up operating parameters.

According to the fifth embodiment of present disclosure, the association procedure 720 implements the same functionality as the association procedure 520 and the WUR negotiation procedure 530 in the third embodiment. As a result, the fifth embodiment has better channel efficiency than the third embodiment.

The STA may initiate a power management mode change procedure 725 for changing its power management mode to PS mode after it is associated with the AP 110 via the association procedure 720 with the AP 110. During the power management mode change procedure 725, the STA may transmit a QoS Null frame with the Power Management subfield set to 1 to the AP 110; and the AP 110 will respond with an ACK frame. After receiving the ACK frame, the STA transits to operate in PS mode. After that, the STA may initiate a WUR mode entry procedure 730 with the AP 110. During the WUR mode entry procedure 730, the STA transmit a WUR Mode Request frame to the AP 110 with a request for entering WUR mode, and then the AP 110 responds with a WUR Mode Response frame which indicates whether the STA's request for entering WUR mode is accepted or rejected. After receiving the WUR Mode Response frame indicating the request for entering WUR mode is accepted, the STA enters WUR mode and stays in WUR doze state.

According to the fifth embodiment of the present disclosure, when the WUR of the STA staying in WUR doze state receives a unicast wake-up frame 702 from the AP 110, it transits to WUR awake state as shown in FIG. 7, and then initiates a DL data transmission and acknowledgement procedure 740 with the AP 110. During the DL data transmission and acknowledgement procedure 740, it may transmit a PS-Poll frame to the AP 110 via its PCR to retrieve buffered traffic and acknowledge successful receipt of the wake-up frame 702. The AP 110 responds to the PS-Poll frame with a buffered Data frame or an ACK frame followed in a separate TXOP by a buffered Data frame at the head of transmit queue. If there is more buffered traffic for the STA, the More Data field in the delivered Data frame is set to 1. Otherwise, the More Data field in the delivered Data frame is set to 0. The STA responds with an acknowledgement frame for acknowledging successful receipt of the Data frame. The acknowledgement frame is either an ACK frame or a BlockAck frame. After transmitting the acknowledgement frame which acknowledges successful receipt of the Data frame with the More Data field set to 0, the STA transits to WUR doze state.

According to the second aspect of the present disclosure, the STA may transit to WUR awake state from WUR doze state even if no wake-up frame is received or no UL data traffic is buffered. For one example, when the STA intends to negotiate new user-specific wake-up operating parameters (e.g., duty cycle schedule of its WUR receiver) with the AP 110, it transits to WUR awake state from WUR doze state and initiates a WUR negotiation procedure 750 with the AP 110. During the WUR negotiation procedure 750, the STA sends a WUR Mode Request frame to the AP 110 which contains requested user-specific wake-up operating parameters, and then the AP 110 responds with a WUR Mode Response frame which contains agreed user-specific wake-up operating parameters. After receiving the WUR Mode Response frame, the STA transits to WUR doze state. For another example, when the STA intends to exit WUR mode, it transits to WUR awake state from WUR doze state and initiates a WUR mode exit procedure 760 with the AP 110. During the WUR mode exit procedure 760, the STA sends a WUR Mode Request frame to the AP 110 with a request for exiting WUR mode, and then the AP 110 responds with a WUR Mode Response frame which indicates whether the STA's request for exiting WUR mode is accepted or rejected. After receiving the WUR Mode Response frame indicating the request for exiting WUR mode is accepted, the STA exits WUR mode and operates in PS mode only.

According to the second aspect of the present disclosure, the STA operating in WUR mode is allowed to initiate a WUR negotiation procedure with the AP 110 to negotiate new user-specific wake-up operating parameters as illustrated in FIG. 7, with no need of exiting WUR mode. As a result, channel efficiency is maximized.

According to the second aspect of present disclosure, if the AP 110 intends to negotiate new user-specific wake-up operating parameters with the STA operating in WUR mode, it sends a wake-up frame to inform the STA operating in WUR mode that it intends to negotiate new user-specific wake-up operating parameters, as illustrated in FIG. 10. After receiving such a wake-up frame, the STA operating in WUR mode initiates a WUR negotiation procedure with the AP 110 to negotiate new user-specific wake-up operating parameters, with no need of exiting WUR mode. As a result, channel efficiency is maximized.

Sixth Embodiment

Figure 8:
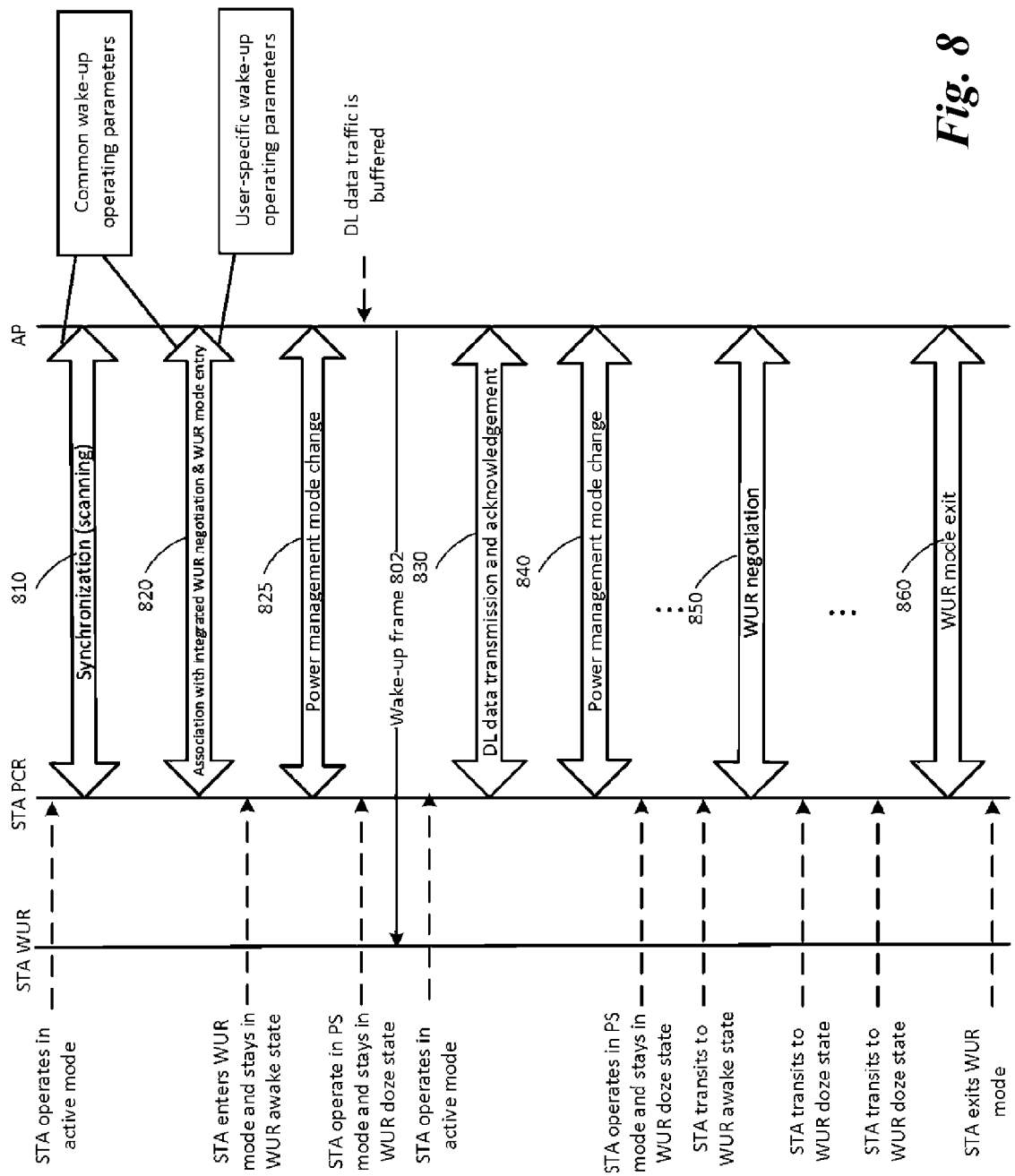
FIG. 8 is a diagram illustrating example WUR mode operation related MAC procedures according to a sixth embodiment of the present disclosure.

FIG. 8 illustrates example WUR mode operation related MAC procedures operated by a WUR STA and the AP 110 according to a sixth embodiment of the present disclosure. Before the STA is associated with the AP 110, it shall operate in active mode and initiate a synchronization procedure 810 to acquire synchronization with the AP 110 via passive scanning or active scanning During the synchronization procedure 810, if active scanning is performed, the STA sends a Probe Request frame to the AP 110, which contains WUR capability information of the STA. And then the AP 110 responds with a Probe Response frame which contains common wake-up operating parameters as well as necessary synchronization information. The Probe Response frame also contains WUR capability information of the AP 110. If passive scanning is performed, the STA receives a Beacon frame from the AP 110 which contain common wake-up operating parameters as well as necessary synchronization information. The Beacon frame also contains WUR capability information of the AP 110.

After the STA gets synchronized with the AP 110 via the synchronization procedure 810, it may initiate an association procedure 820 with the AP 110, which incorporates WUR negotiation and WUR mode entry. During the association procedure 820, the STA sends an Association Request or a Reassociation Request frame to the AP 110, which contains requested user-specific wake-up operating parameters and a request for entering WUR mode. And then the AP 110 responds with an Association Response frame or a Reassociation Response frame, which indicates whether the STA's request for entering WUR mode is accepted or rejected and contains agreed user-specific wake-up operating parameters. After receiving the Association Response frame or the Reassociation Response frame indicating the request for entering WUR mode is accepted, the STA enters WUR mode and stays in WUR awake state.

According to the sixth embodiment of present disclosure, the association procedure 820 implements the same functionality as the association procedure 620 and the integrated WUR negotiation and WUR mode entry procedure 630 in the fourth embodiment. As a result, the sixth embodiment has better channel efficiency than the fourth embodiment.

The STA may initiate a power management mode change procedure 825 for changing its power management mode to PS mode after it is associated with the AP 110 via the association procedure 820 with the AP 110. During the power management mode change procedure 825, the STA may transmit a QoS Null frame with the Power Management subfield set to 1 to the AP 110; and the AP 110 will respond with an ACK frame. After receiving the ACK frame, the STA transits to operate in PS mode and stays in WUR doze state.

According to the present disclosure, when the WUR receiver of the STA staying in WUR doze state receives a unicast wake-up frame 802 from the AP 110, it may change its power management mode to active mode as shown in FIG. 8, and then initiate a DL data transmission and acknowledgement procedure 830 with the AP 110. During the DL data transmission and acknowledgement procedure 830, it may transmit a QoS Null frame with the Power Management subfield set to 0 to the AP 110 via its PCR to retrieve buffered traffic and acknowledge successful receipt of the wake-up frame 802. The AP 110 responds to the QoS Null frame with an ACK frame, followed by a buffered Data frame at the head of transmit queue. If there is more buffered traffic for the STA, the More Data field in the delivered Data frame is set to 1. Otherwise, the More Data field in the delivered Data frame is set to 0. The STA responds with an acknowledgement frame for acknowledging successful receipt of the Data frame. The acknowledgement frame is either an ACK frame or a BlockAck frame.

After transmitting the acknowledgement frame which acknowledges successful receipt of the Data frame with the More Data field set to 0, the STA may initiate a power management mode change procedure 840 for changing back to PS mode. During the power management mode change procedure 840, the STA sends a QoS Null frame with the Power Management subfield set to 1 to the AP 110, and then the AP 110 responds with an ACK frame. After receiving the ACK frame, the STA transits to operate in PS mode and stays in WUR doze state.

According to the second aspect of the present disclosure, the STA may transit to WUR awake state from WUR doze state even if no wake-up frame is received or no UL data traffic is buffered. For one example, when the STA intends to negotiate new user-specific wake-up operating parameters (e.g., duty cycle schedule of its WUR receiver) with the AP 110, it transits to WUR awake state from WUR doze state and initiates another WUR negotiation procedure 850 with the AP 110. During the WUR negotiation procedure 850, the STA sends a WUR Mode Request frame to the AP 110 which contains requested user-specific wake-up operating parameters, and then the AP 110 responds with a WUR Mode Response frame which contains agreed user-specific wake-up operating parameters. After receiving the WUR Mode Response frame, the STA transits to WUR doze state. For another example, when the STA intends to exit WUR mode, it transits to WUR awake state from WUR doze state and initiates a WUR mode exit procedure 860 with the AP 110. During the WUR mode exit procedure 860, the STA sends a WUR Mode Request frame to the AP 110 with a request for exiting WUR mode, and then the AP 110 responds with a WUR Mode Response frame which indicates whether the STA's request for exiting WUR mode is accepted or rejected. After receiving the WUR Mode Response frame indicating the request for exiting WUR mode is accepted, the STA exits WUR mode and operates in PS mode only.

According to the second aspect of the present disclosure, the STA operating in WUR mode is allowed to initiate a WUR negotiation procedure with the AP 110 to negotiate new user-specific wake-up operating parameters as illustrated in FIG. 8, with no need of exiting WUR mode. As a result, channel efficiency is maximized.

According to the second aspect of the present disclosure, if the AP 110 intends to negotiate new user-specific wake-up operating parameters with the STA operating in WUR mode, it sends a wake-up frame to inform the STA operating in WUR mode that it intends to negotiate new user-specific wake-up operating parameters, as illustrated in FIG. 10. After receiving such a wake-up frame, the STA operating in WUR mode initiates a WUR negotiation procedure with the AP 110 to negotiate new user-specific wake-up operating parameters, with no need of exiting WUR mode. As a result, channel efficiency is maximized.

Figure 9:
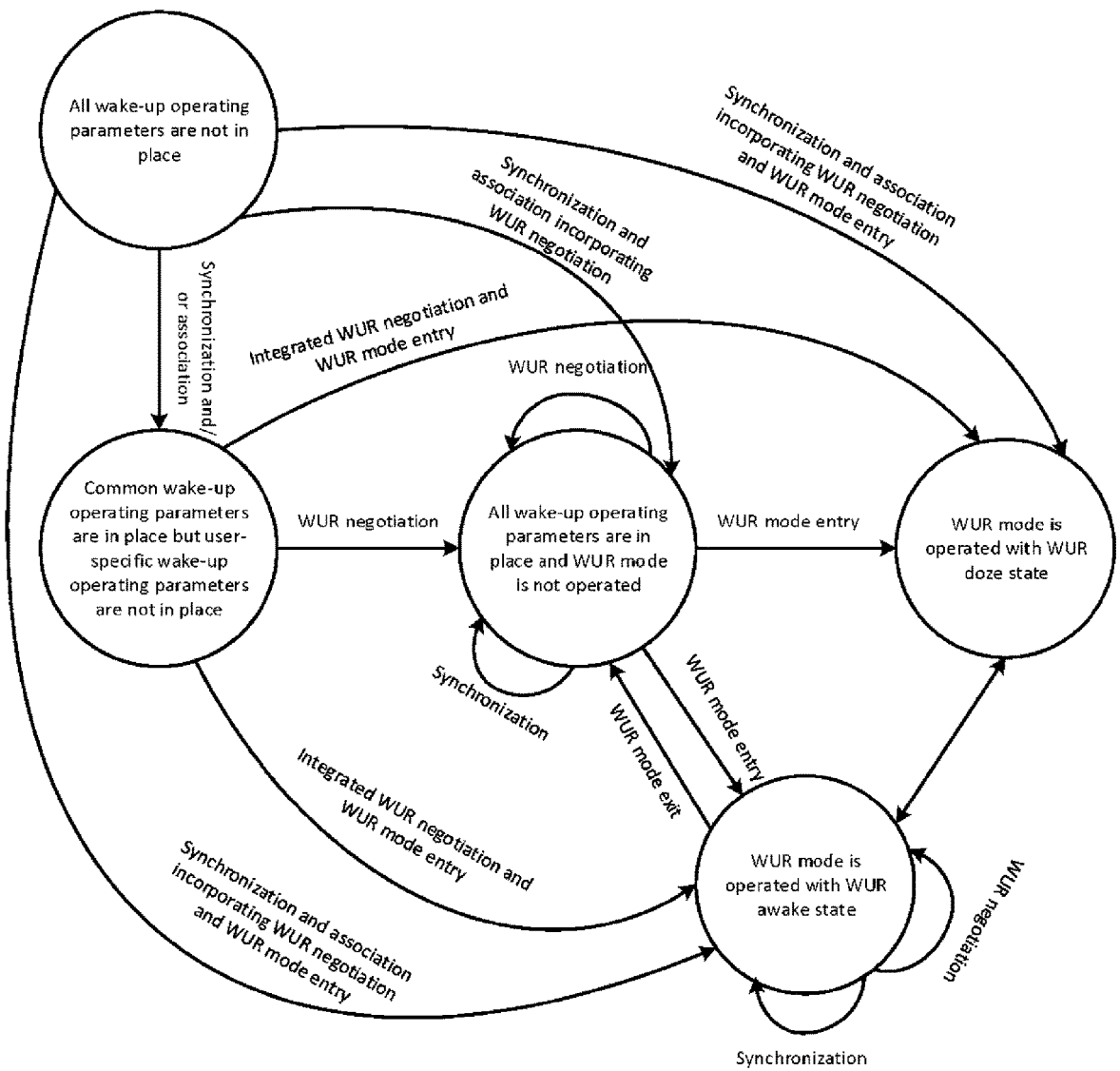
FIG. 9 is a diagram illustrating WUR mode operation related state transition for a wireless communication device according to a second aspect of the present disclosure.

FIG. 9 illustrates WUR mode operation related state transition for the STA according to the second aspect of the present disclosure. The STA has five states related to WUR mode operation. In a first state, all wake-up operating parameters are not in place. In a second state, common wake-up operating parameters are in place but user-specific wake-up operating parameters are not in place. In a third state, all wake-up operating parameters are in place but WUR mode is not operated. In a fourth state, WUR mode is operated with WUR doze state. In a fifth state, WUR mode is operated with WUR awake state. As illustrated in FIG. 9, the STA staying in the first state can transit to the second state after a synchronization procedure and/or an association procedure is completed, transit to the third state after a synchronization procedure and an association procedure incorporating WUR negotiation is completed, transit to the fourth state after a synchronization procedure and an association procedure incorporating WUR negotiation and WUR mode entry is completed and if the STA also operates in PS mode, or transit to the fifth state after a synchronization procedure and an association procedure incorporating WUR negotiation and WUR mode entry is completed and if the STA also operates in active mode. The STA staying in the second state can transit to the third state after a WUR negotiation procedure is completed, transit to the fourth state after an integrated WUR negotiation and WUR mode entry procedure is completed and if the STA also operates in PS mode, or transit to the fifth state after an integrated WUR negotiation and WUR mode entry procedure is completed and if the STA also operates in active mode. The STA staying in the third state can transit to the fourth state after a WUR mode entry procedure is completed and if the STA also operates in PS mode, transit to the fifth state after a WUR mode entry procedure is completed and if the STA also operates in active mode, update user-specific wake-up operating parameters after a WUR negotiation procedure is completed, or update common wake-up operating parameters after a Beacon frame is received from the AP 110. The STA staying in the fourth state can transit to the fifth state for various reasons, e.g., when UL data traffic is buffered, or when a wake-up frame is received. The STA staying in the fifth state can transit to the third state after a WUR mode exit procedure is completed, update user-specific wake-up operating parameters after a WUR negotiation procedure is completed, or update common wake-up operating parameters after a Beacon frame is received from the AP 110. The STA staying in the fifth state can transit to the fourth state for various reasons, e.g., after acknowledging a DL Data frame with the More Data field set to 0 or receiving an acknowledgement frame which acknowledges an UL Data frame with the More Data field set to 0.

An Example Format of a Wake-Up Frame

FIG. 10 illustrates an example format of wake-up frame 1000 according to the present disclosure. The wake-up frame 1000 comprises a Type field 1002, a BSS Color field 1004, a STA ID field 1006, and a Parameter Negotiation Request field 1008. The Type field 1002 indicates the type of the wake-up frame 1000, e.g., unicast wake-up frame, multicast wake-up frame or WUR Beacon frame. The BSS Color field 1004 indicates the identifier of the network 100. The STA ID field 1006 indicates the identifier of intended STA. When the wake-up frame 1000 is not a unicast wake-up frame, the STA ID field 1006 is not present. The Parameter Negotiation Request field 1008 indicates whether the AP 110 intends to negotiate new wake-up operating parameters or new user-specific wake-up operating parameters.

An Example Format of a WUR Action Frame

FIG. 11 illustrates an example format of WUR Action frame 1100 according to the present disclosure. The WUR Action frame 1100 comprises a MAC Header portion 1110 and a Frame Body portion 1120. The Frame Body portion 1120 comprises a WUR Action field 1122 and a WUR Mode element 1124. The WUR Action field 1122 indicates the type of the WUR Action frame 1100, e.g., WUR Mode Request frame or WUR Mode Response frame.

FIG. 12 illustrates an example format of WUR Mode element 1124 according to the first aspect of the present disclosure. The WUR Mode element 1124 comprises an Action Type field 1202, a WUR Mode Response Status field 1204, a Common Parameters field 1206, a User-Specific Parameters field 1208 and a Parameter Change Interval field 1210. The Action Type field 1202 indicates which one of the WUR negotiation procedure, the WUR mode entry procedure, the integrated WUR negotiation and WUR mode entry procedure and the WUR mode exit procedure the WUR Action frame 1120 containing the WUR Mode element 1124 involves, as illustrated in FIG. 13. The WUR Mode Response Status field 1204 indicates whether the request for entering or exiting WUR mode is accepted or rejected. The Common Parameters field 1206 contains common wake-up operating parameters such as the WUR Beacon interval, the WUR time unit and the minimum wake-up duration, etc. The User-Specific Parameters field 1208 contains user-specific wake-up operating parameters such as the WUR sleep interval, the duty cycle schedule of the STA's WUR receiver, the data rate feedback request, the WUR channel and the STA ID, etc. The Parameter Change Interval field 1210 indicates when new wake-up operating parameters take effect.

FIG. 14 illustrates an example format of WUR Mode element 1124 according to the second aspect of the present disclosure. The WUR Mode element 1124 comprises an Action Type field 1402, a WUR Mode Response Status field 1404, a User-Specific Parameters field 1408 and a Parameter Change Interval field 1410. The Action Type field 1402 indicates which one of the WUR negotiation procedure, the WUR mode entry procedure, the integrated WUR negotiation and WUR mode entry procedure and the WUR mode exit procedure the WUR Action frame 1120 containing the WUR Mode element 1124 involves, as illustrated in FIG. 13. The WUR Mode Response Status field 1404 indicates whether the request for entering or exiting WUR mode is accepted or rejected. The User-Specific Parameters field 1408 contains user-specific wake-up operating parameters such as the WUR sleep interval, the duty cycle schedule of the STA's WUR receiver, the data rate feedback request, the WUR channel and the STA ID, etc. The Parameter Change Interval field 1410 indicates when new user-specific wake-up operating parameters take effect.

An Example Format of a WUR Operation Element

FIG. 15 illustrates an example format of WUR Operation element 1500 according to the second aspect of the present disclosure. The WUR Operation element 1500 comprises a Common Parameters field 1506. The Common Parameters field 1506 contains common wake-up operating parameters such as the WUR Beacon interval, the WUR time unit and the minimum wake-up duration, etc.

Configuration of a WUR Apparatus

FIG. 16A is a simple block diagram of an example WUR 1600 which is capable of receiving wake-up signal. The WUR 1600 may be the WUR 134 in the STA 130 or the WUR 144 in the STA 140 as illustrated in FIG. 1. The WUR 1600 comprises a receiver 1610 and a receive signal processing circuitry 1620. The receiver 1610 is responsible for reception of wake-up signal, and the receive signal processing circuitry 1620 is responsible for processing the received wake-up signal.

FIG. 16B is a detailed block diagram of the example WUR 1600. The WUR 1600 further comprises control circuitry 1630, which is used to control general MAC protocol operations. The receiver 1610 of the WUR 1600 comprises PHY processing circuitry 1612, which is responsible for converting PPDUs received through antennas into MAC frames (e.g., wake-up frames or WUR Beacon frames). The receive signal processing circuitry 1620 of the WUR 1600 comprises a message processing circuitry 1622, which is responsible for processing the received MAC frames (e.g., parsing MAC Header, etc.) under the control of the control circuitry 1630 according to the various embodiments of the present disclosure and passing the corresponding MAC information to the control circuitry 1630.

The WUR 1600 may comprise many other components that are not illustrated, for sake of clarity, in FIG. 16A and FIG. 16B. Only those components that are most pertinent to the present disclosure are illustrated.

Configuration of a PCR Apparatus

FIG. 17A is a simple block diagram of an example PCR 1700 which is capable for transmitting and receiving standard IEEE 802.11 signal. The PCR 1700 may be the PCR 112 in the AP 110, the PCR 132 in the STA 130 or the PCR 142 in the STA 140 as illustrated in FIG. 1. In particular, the PCR 112 in the AP 110 is also capable for transmitting wake-up signal. The PCR 1700 comprises transmission signal generating circuitry 1710, a transceiver 1720 and receive signal processing circuitry 1730. The transmission signal generating circuitry 1710 is responsible for generating standard IEEE 802.11 signal and wake-up signal if applicable, the transceiver 1720 is responsible for transmitting the generated standard IEEE 802.11 signal and wake-up signal if applicable as well as receiving the standard IEEE 802.11 signal, and the receive signal processing circuitry 1730 is responsible for processing the received standard IEEE 802.11 signal.

FIG. 17B is a detailed block diagram of the example PCR 1700. The PCR 1700 further comprises control circuitry 1740, which is used to control general MAC protocol operation. The transmission signal generating circuitry 1710 comprises message generating circuitry 1712, which is responsible for generating MAC frames (e.g., Beacon frame, Probe Request/Response frame, Association Request/Response frame, Reassociation Request/Response frame, Data frame, acknowledgement frame, WUR Action frame, wake-up frame and WUR Beacon frame) under the control of the control circuitry 1740 according to various embodiments of the present disclosure. The transceiver 1720 comprises PHY processing circuitry 1722, which is responsible for formulating the generated MAC frames into PPDUs and transmitting them through antennas as well as converting PPDUs received through the antennas into MAC frames. The receive signal processing circuitry 1730 comprises message processing circuitry 1732, which is responsible for processing the received MAC frames (e.g., parsing MAC Header, etc.) under the control of the control circuitry 1740 and passing the corresponding MAC information to the control circuitry 1740.

The PCR 1700 may comprise many other components that are not illustrated, for sake of clarity, in FIG. 17A and FIG. 17B. Only those components that are most pertinent to the present disclosure are illustrated.

WUR Mode Operation Related State Machine

FIG. 18 illustrates simplified WUR mode operation related state machine for the STA according to the present disclosure. The STA has three states related to WUR mode operation. The first state is called "no WUR" in which wake-up operating parameters are not in place. In the first state, negotiating wake-up operating parameters between the AP 110 and the STA has not been completed or the negotiated wake-up operating parameters are discarded after the STA exits from the WUR mode. The first state as illustrated in FIG. 18 corresponds to the first state as illustrated in FIG. 4 or the first and second states as illustrated in FIG. 9. The second state is called "WUR Mode Suspend" in which wake-up operating parameters are in place but WUR mode is not operated. In the second state, negotiating wake-up operating parameters between the AP 110 and the STA has been completed or the negotiated wake-up operating parameters are maintained after the STA exits from the WUR mode. The second state as illustrated in FIG. 18 corresponds to the second state as illustrated in FIG. 4 or the third state as illustrated in FIG. 9. The third state is called "WUR Mode" in which the STA operates in the WUR mode according to the negotiated wake-up operating parameters. The third state as illustrated in FIG. 18 corresponds to the third and fourth states as illustrated in FIG. 4 or the fourth and fifth states as illustrated in FIG. 9.

As illustrated in FIG. 18, the STA staying in "no WUR" can transit to operate in "WUR Mode Suspend" after a two-way setup procedure initiated by the STA is completed. FIG. 19A illustrates a first example two-way setup procedure according to the present disclosure. The first example two-way setup procedure has the same functionality as the association procedure incorporating WUR negotiation as illustrated in FIG. 7. The STA transmits an Association Request frame or a Reassociation Request frame to the AP 110. The Association Request frame or the Reassociation Request frame contains a WUR Mode element (as illustrated in FIG. 12) in which the Action Type field is set to "Enter WUR Mode Suspend Request" (as illustrated in FIG. 25) and the User-Specific Parameters field contains the preferred duty cycle schedule of the STA's WUR receiver. The AP 110 responds with an Ack frame upon the successful receipt of the Association Request frame or the Reassociation Request frame. After that, the AP 110 transmits an Association Response frame or a Reassociation Response frame to the STA. The Association Response frame or the Reassociation Response frame contains a WUR Mode element (as illustrated in FIG. 12) in which the Action Type field is set to "Enter WUR Mode Suspend Response" (as illustrated in FIG. 25) and the WUR Mode Response Status field is set to "Enter WUR Mode Suspend Accept" or "Denied" (as illustrated in FIG. 26). If the WUR Mode Response Status field is set to "Enter WUR Mode Suspend Accept", the Common Parameters field contains the WUR Beacon interval, etc and the User-Specific Parameters field contains the duty cycle schedule of the STA's WUR receiver, WID and WUR operating channel, etc. If the WUR Mode Response Status field is set to "Denied", the Common Parameters field and the User-Specific Parameters field are not present. FIG. 19B illustrates a second example two-way setup procedure according to the present disclosure. The second example two-way setup procedure has the same functionality as the WUR negotiation procedure as illustrated in FIG. 2. The STA transmits a WUR Mode Setup frame to the AP 110. The WUR Mode Setup frame is a WUR Action frame (as illustrated in FIG. 11) with the WUR Action field set to "WUR Mode Setup" (as illustrated in FIG. 24). The WUR Mode Setup frame contains a WUR Mode element (as illustrated in FIG. 12) in which the Action Type field is set to "Enter WUR Mode Suspend Request" (as illustrated in FIG. 25) and the User-Specific Parameters field contains the preferred duty cycle schedule of the STA's WUR receiver. The AP 110 responds with an Ack frame upon the successful receipt of the WUR Mode Setup frame. After that, the AP 110 transmits an WUR Mode Setup frame to the STA. The WUR Mode Setup frame contains a WUR Mode element (as illustrated in FIG. 12) in which the Action Type field is set to "Enter WUR Mode Suspend Response" (as illustrated in FIG. 25) and the WUR Mode Response Status field is set to "Enter WUR Mode Suspend Accept" or "Denied" (as illustrated in FIG. 26). If the WUR Mode Response Status field is set to "Enter WUR Mode Suspend Accept", the Common Parameters field contains the WUR Beacon interval, etc and the User-Specific Parameters field contains the duty cycle schedule of the STA's WUR receiver, WID and WUR operating channel, etc. If the WUR Mode Response Status field is set to "Denied", the Common Parameters field and the User-Specific Parameters field are not present.

As illustrated in FIG. 18, the STA staying in the "WUR Mode Suspend" can transit to operate in the "No WUR" after a one-way teardown procedure initiated by the AP 110 or the STA is completed. FIG. 20A illustrates a first example one-way teardown procedure initiated by the STA. The STA transmits a WUR Mode Teardown frame to the AP 110. The WUR Mode Teardown frame is a WUR Action frame (as illustrated in FIG. 11) with the WUR Action field set to "WUR Mode Teardown" (as illustrated in FIG. 24). The WUR Mode Teardown frame does not include a WUR Mode element. The AP 110 responds with an Ack frame upon the successful receipt of the WUR Mode Teardown frame. After receiving the Ack frame, the STA discards the negotiated wake-up operating parameters. FIG. 20B illustrates a second example one-way teardown procedure initiated by the AP 110. The AP 110 transmits an WUR Mode Teardown frame to the STA. The WUR Mode Teardown frame does not include a WUR Mode element. The STA responds with an Ack frame upon the successful receipt of the WUR Mode Teardown frame. After transmitting the Ack frame, the STA discards the negotiated wake-up operating parameters.

As illustrated in FIG. 18, the STA staying in the "No WUR" can transit to operate in the "WUR Mode" after a two-way setup procedure initiated by the STA is completed. FIG. 19A illustrates a first example two-way setup procedure. The first example two-way setup procedure has the same functionality as the association procedure incorporating integrated WUR negotiation and WUR mode entry as illustrated in FIG. 8. The STA transmits an Association Request frame or a Reassociation Request frame to the AP 110. The Association Request frame or the Reassociation Request frame contains a WUR Mode element (as illustrated in FIG. 12) in which the Action Type field is set to "Enter WUR Mode Request" (as illustrated in FIG. 25) and the User-Specific Parameters field contains the preferred duty cycle schedule of the STA's WUR receiver. The AP 110 responds with an Ack frame upon the successful receipt of the Association Request frame or the Reassociation Request frame. After that, the AP 110 transmits an Association Response frame or a Reassociation Response frame to the STA. The Association Response frame or the Reassociation Response frame contains a WUR Mode element (as illustrated in FIG. 12) in which the Action Type field is set to "Enter WUR Mode Response" (as illustrated in FIG. 25) and the WUR Mode Response Status field is set to "Enter WUR Mode Accept" or "Denied" (as illustrated in FIG. 26). If the WUR Mode Response Status field is "Enter WUR Mode Accept", the Common Parameters field contains the WUR Beacon interval, etc and the User-Specific Parameters field contains the duty cycle schedule of the STA'WUR receiver, WID and WUR operating channel, etc. If the WUR Mode Response Status field is set to "Denied", the Common Parameters field and the User-Specific Parameters field are not present. FIG. 19B illustrates a second example two-way setup procedure. The second example two-way setup procedure has the same functionality as the integrated WUR negotiation and WUR mode entry procedure as illustrated in FIG. 3. The STA transmits an WUR Mode Setup frame to the AP 110. The WUR Mode Setup frame contains a WUR Mode element (as illustrated in FIG. 12) in which the Action Type field is set to "Enter WUR Mode Request" (as illustrated in FIG. 25) and the User-Specific Parameters field contains the preferred duty cycle schedule of the STA's WUR receiver. The AP 110 responds with an Ack frame upon the successful receipt of the WUR Mode Setup frame. After that, the AP 110 transmits an WUR Mode Setup frame to the STA. The WUR Mode Setup frame contains a WUR Mode element (as illustrated in FIG. 12) in which the Action Type field is set to "Enter WUR Mode Response" (as illustrated in FIG. 25) and the WUR Mode Response Status field is set to "Enter WUR Mode Accept" or "Denied" (as illustrated in FIG. 26). If the WUR Mode Response Status field is "Enter WUR Mode Accept", the Common Parameters field contains the WUR Beacon interval, etc and the User-Specific Parameters field contains the duty cycle schedule of the STA's WUR receiver, WID and WUR operating channel, etc. If the WUR Mode Response Status field is set to "Denied", the Common Parameters field and the User-Specific Parameters field are not present.

As illustrated in FIG. 18, the STA staying in the "WUR Mode" can transit to operate in the "No WUR" after a one-way teardown procedure initiated by the STA or the AP 110 is completed. FIG. 20A illustrates a first example one-way teardown procedure initiated by the STA. The STA transmits a WUR Mode Teardown frame to the AP 110. The WUR Mode Teardown frame is a WUR Action frame (as illustrated in FIG. 11) with the WUR Action field set to "WUR Mode Teardown" (as illustrated in FIG. 24). The WUR Mode Teardown frame does not include a WUR Mode element. The AP 110 responds with an Ack frame upon the successful receipt of the WUR Mode Teardown frame. After receiving the Ack frame, the STA exits from the WUR mode and discards the negotiated wake-up operating parameters. FIG. 20B illustrates a second example one-way teardown procedure initiated by the AP 110. The AP 110 transmits an WUR Mode Teardown frame to the STA. The WUR Mode Teardown frame does not include a WUR Mode element. The STA responds with an Ack frame upon the successful receipt of the WUR Mode Teardown frame. After transmitting the Ack frame, the STA exits from the WUR mode and discards the negotiated wake-up operating parameters.

As illustrated in FIG. 18, the STA staying in the "WUR Mode Suspend" can transit to the "WUR Mode" after a one-way or two-way setup procedure initiated by the STA is completed. FIG. 21A illustrates an example one-way setup procedure initiated by the STA. The example one-way setup procedure has the same functionality as the WUR mode entry procedure as illustrated in FIG. 5. The STA transmits a WUR Mode Setup frame to the AP 110. The WUR Mode Setup frame contains a WUR Mode element (as illustrated in FIG. 12) in which the Action Type field is set to "Enter WUR Mode" (as illustrated in FIG. 25) and the Common Parameters field and the User-Specific Parameters field are not present. The AP 110 responds with an Ack frame upon the successful receipt of the WUR Mode Setup frame. After receiving the Ack frame, the STA operates in the WUR mode according to the existing wake-up operating parameters. FIG. 19B illustrates an example two-way setup procedure initiated by the STA. The example two-way setup procedure has the same functionality as the integrated WUR mode entry and WUR negotiation procedure as illustrated in FIG. 3. The STA transmits a WUR Mode Setup frame to the AP 110. The WUR Mode Setup frame contains a WUR Mode element (as illustrated in FIG. 12) in which the Action Type field is set to "Enter WUR Mode Request" (as illustrated in FIG. 25) and the User-Specific Parameters field contains the preferred duty cycle schedule of the STA's WUR receiver. The AP 110 responds with an Ack frame upon the successful receipt of the WUR Mode Setup frame. After that, the AP 110 transmits a WUR Mode Setup frame to the STA. The WUR Mode Setup frame contains a WUR Mode element (as illustrated in FIG. 12) in which the Action Type field is set to "Enter WUR Mode Response" (as illustrated in FIG. 25) and the WUR Mode Response Status field is set to "Enter WUR Mode Accept" or "Denied" (as illustrated in FIG. 26). If the WUR Mode Response Status field is "Enter WUR Mode Accept", the Common Parameters field contains the WUR Beacon interval, etc and the User-Specific Parameters field contains the duty cycle schedule of the STA's WUR receiver, WID and WUR operating channel, etc. If the WUR Mode Response Status field is set to "Denied", the Common Parameters field and the User-Specific Parameters field are not present.

As illustrated in FIG. 18, the STA staying in the "WUR Mode" can transit to the "WUR Mode Suspend" after a one-way setup procedure initiated by the STA or the AP 110 is completed. FIG. 21A illustrates a first example one-way setup procedure initiated by the STA. The first example one-way setup procedure has the same functionality as the WUR mode exit procedure as illustrated in FIG. 2. The STA transmits a WUR Mode Setup frame to the AP 110. The WUR Mode Setup frame contains a WUR Mode element (as illustrated in FIG. 12) in which the Action Type field is set to "Enter WUR Mode Suspend" (as illustrated in FIG. 25) and the Common Parameters field and the User-Specific Parameters field are not present. The AP 110 responds with an Ack frame upon the successful receipt of the WUR Mode Setup frame. After receiving the Ack frame, the STA exits from the WUR mode and maintains the negotiated wake-up operating parameters. FIG. 21B illustrates a second example one-way setup procedure initiated by the AP 110. The AP 110 transmits a WUR Mode Setup frame to the STA. The WUR Mode Setup frame contains a WUR Mode element (as illustrated in FIG. 12) in which the Action Type field is set to "Enter WUR Mode Suspend" (as illustrated in FIG. 25) and the Common Parameters field and the User-Specific Parameters field are not present. The STA responds with an Ack frame upon the successful receipt of the WUR Mode Setup frame. After transmitting the Ack frame, the STA exits from the WUR mode and maintains the negotiated wake-up operating parameters.

As illustrated in FIG. 18, for the STA staying in the "WUR Mode Suspend" or "WUR Mode", the wake-up operating parameters can be updated via a one-way procedure initiated by the AP 110 or a two-way update procedure initiated by the STA. FIG. 22 illustrates an example one-way update procedure initiated by the AP 110. The AP 110 transmits a WUR Mode Update frame to the STA. The WUR Mode Update frame is a WUR Action frame (as illustrated in FIG. 11) with the WUR Action field set to "WUR Mode Update" (as illustrated in FIG. 24). The WUR Mode Update frame contains a WUR Mode element (as illustrated in FIG. 12) in which the Action Type field is set to "Update WUR Parameters" (as illustrated in FIG. 25), the Common Parameters field contains the WUR Beacon interval, etc., the User-Specific Parameters field contains the duty cycle schedule of the STA's WUR receiver, WID and WUR operating channel, etc., and the Parameter Change Interval field indicates when new wake-up operating parameters take effect. The STA responds with an Ack frame upon the successful receipt of the WUR Mode Update frame and updates the wake-up operating parameters accordingly. FIG. 23 illustrates an example two-way update procedure initiated by the STA. The example two-way update procedure has the same functionality as the WUR negotiation procedure as illustrated in FIG. 2. The STA transmits a WUR Mode Update frame to the AP 110. The WUR Mode Update frame contains a WUR Mode element (as illustrated in FIG. 12) in which the Action Type field is set to "Update WUR Parameters Request" (as illustrated in FIG. 25) and the User-Specific Parameters field contains the preferred duty cycle schedule of the STA's WUR receiver. The AP 110 responds with an Ack frame upon the successful receipt of the WUR Mode Update frame. After that, the AP 110 transmits a WUR Mode Update frame to the STA. The WUR Mode Update frame contains a WUR Mode element (as illustrated in FIG. 12) in which the Action Type field is set to "Update WUR Parameters Response" (as illustrated in FIG. 25), the Common Parameters field contains the WUR Beacon interval, etc, the User-Specific Parameters field contains the duty cycle schedule of the STA's WUR receiver, WID and WUR operating channel, etc., and the Parameter Change Interval field indicates when new wake-up operating parameters take effect. The STA responds with an Ack frame upon the successful receipt of the WUR Mode Update frame and updates the wake-up operating parameters accordingly.

According to the present disclosure, if the AP 110 intends to change wake-up operating parameters for the STA in the "WUR Mode Suspend" or the "WUR Mode", the one-way update procedure as illustrated in FIG. 22 is preferable since it results in less channel overhead than the two-way update procedure as illustrated in FIG. 23.

According to the present disclosure, if the STA in the "WUR Mode Suspend" intends to transits to operate in the "WUR Mode" with new wake-up operating parameters, the two-way setup procedure as illustrated in FIG. 19B is preferable since it results in less channel overhead than the two-way update procedure as illustrated in FIG. 23 followed by the one-way setup procedure as illustrated in FIG. 21A.

An Example Format of the WUR Action Field

FIG. 24 illustrates another example format of the WUR Action field 1122 of the WUR Action frame 1100 according to the present disclosure. The WUR Action field 1122 indicates the type of the WUR Action frame 1100, e.g., WUR Mode Setup frame, WUR Mode Teardown frame or WUR Mode Update frame.

An Example Format of the Action Type Field

FIG. 25 illustrates another example format of the Action Type field 1202 of the WUR Mode element 1124 according to the present disclosure. The Action Type field 1202 indicates the WUR mode operation related action for the Association Request frame, the Association Response frame, the Reassociation Request frame, the Reassociation Response frame, the WUR Mode Setup frame or the WUR Mode Update frame containing the WUR Mode element 1124.

An Example Format of the WUR Mode Response Status Field

FIG. 26 illustrates another example format of the WUR Mode Response Status 1204 of the WUR Mode element 1124 according to the present disclosure. The WUR Mode Response Status 1204 indicates the STA's request for operating in the "WUR Mode" or "WUR Mode Suspend" is accepted or rejected.

Configuration of a WUR Apparatus

Figure 27:
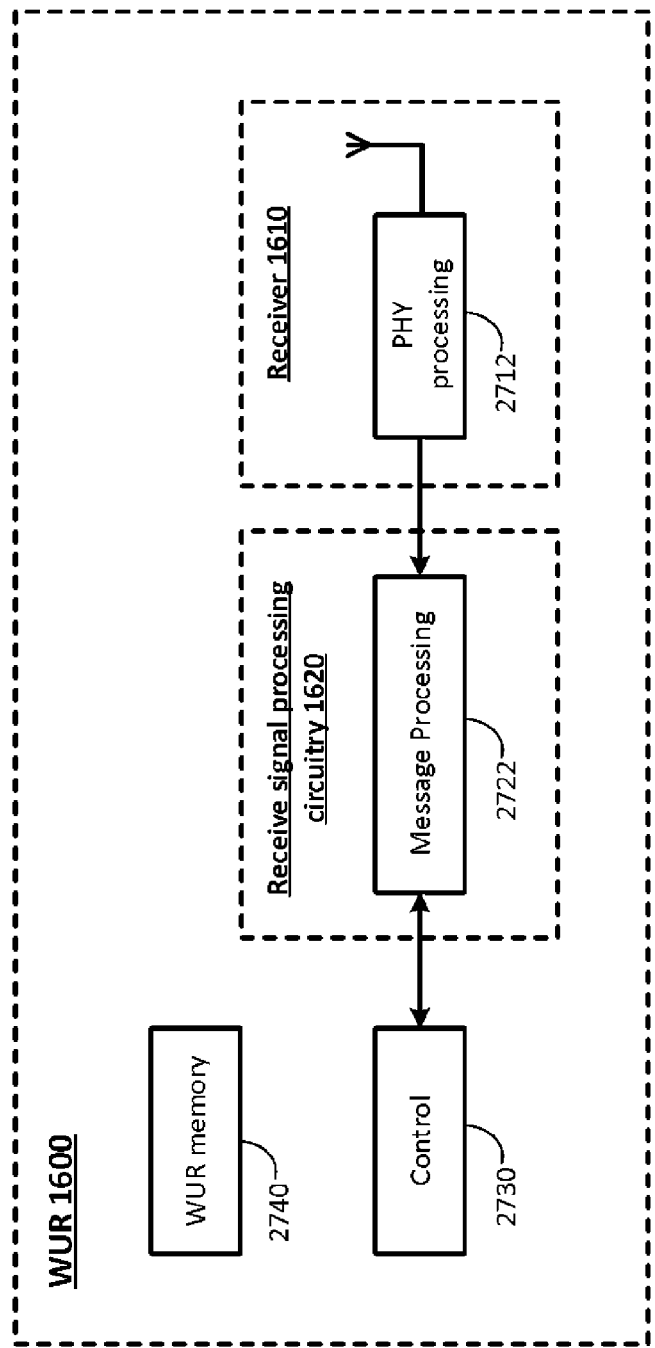
FIG. 27 is a detailed block diagram of another example WUR according to the present disclosure.

FIG. 27 is a detailed block diagram of another example WUR 1600. The WUR 1600 further comprises control circuitry 2730 and a WUR memory 2740. The control circuitry 2730 is used to control general MAC protocol operations. The receiver 1610 comprises PHY processing circuitry 2712, which is responsible for converting PPDUs received through antennas into MAC frames (e.g., wake-up frames or WUR Beacon frames). The receive signal processing circuitry 1620 comprises message processing circuitry 2722, which is responsible for processing the received MAC frames under the control of the control circuitry 2730 according to the various embodiments of the present disclosure and passing the corresponding MAC information to the control circuitry 2730. The WUR memory 2740 is responsible for storing the negotiated wake-up operating parameters between the WUR STA (e.g., 130 or 140) containing the WUR 1600 and the AP 110, especially when the WUR STA operates in the "WUR Mode Suspend".

Configuration of a PCR Apparatus

Figure 28:
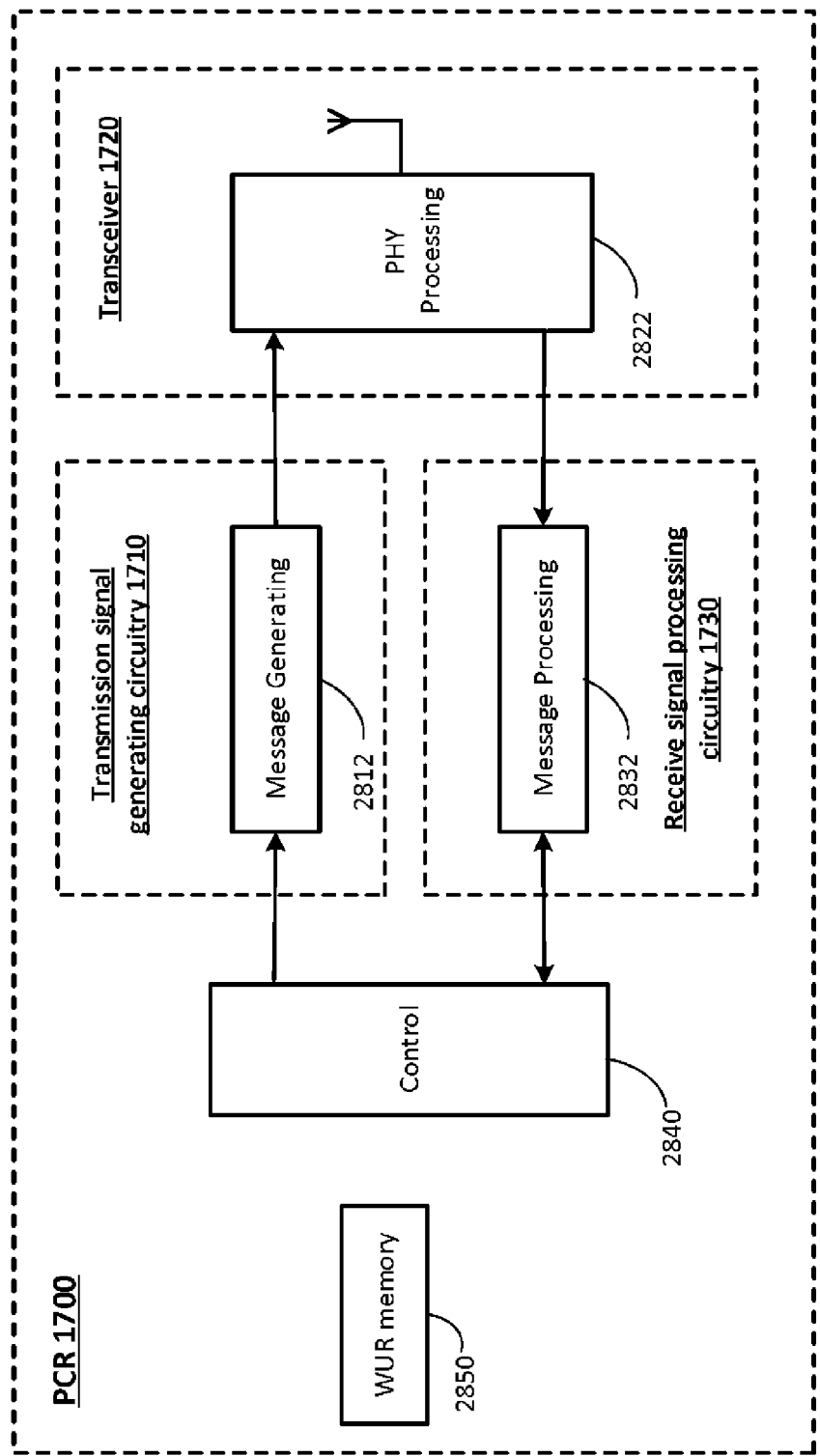
FIG. 28 is a detailed block diagram of another example PCR according to the present disclosure.

FIG. 28 is a detailed block diagram of another example PCR 1700. The PCR 1700 further comprises control circuitry 2840. The control circuitry 2840 is used to control general MAC protocol operation. The transmission signal generating circuitry 1710 comprises message generating circuitry 2812, which is responsible for generating MAC frames (e.g., Beacon frame, Probe Request/Response frame, Association Request/Response frame, Reassociation Request/Response frame, Data frame, acknowledgement frame, WUR Action frame, wake-up frame and WUR Beacon frame) under the control of the control circuitry 2840 according to various embodiments of the present disclosure. The transceiver 1720 comprises PHY processing circuitry 2822, which is responsible for formulating the generated MAC frames into PPDUs and transmitting them through antennas as well as converting PPDUs received through the antennas into MAC frames. The receive signal processing circuitry 1730 comprises message processing circuitry 2832, which is responsible for processing the received MAC frames (e.g., parsing MAC Header, etc.) under the control of the control circuitry 2840 and passing the corresponding MAC information to the control circuitry 2840.

According to the present disclosure, when the PCR 1700 is used in the AP 110, it further comprises a WUR memory 2850, which is responsible for storing the negotiated wake-up operating parameters between the WUR STAs (e.g., 130 and 140) and the AP 110, especially when the WUR STAs operate in the "WUR Mode Suspend".

The present disclosure can be realized by software, hardware, or software in co-operation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing, as a result of the advancement of semiconductor technology or other derivative technology.

Should a circuit integration technology replacing LSI appear as a result of advancements in semiconductor technology or other technologies derived from the technology, the functional blocks could be integrated using the future integrated circuit technology. Another possibility is the application of biotechnology and/or the like.

INDUSTRIAL APPLICABILITY

This disclosure can be applied to an apparatus and a method for WUR mode operation in a wireless network.

REFERENCE SIGNS LIST

110 AP
130, 140 STA
112, 132, 142, 1700 PCR
134, 144, 1600 WUR
1610 Receiver
1612, 2712, 1722, 2822 PHY processing circuitry
1620, 1730 Receive signal processing circuitry
1622, 2722, 1732, 2832 Message processing circuitry
1630, 1740 Control circuitry
1710 Transmission signal generating circuitry
1712, 2812 Message generating circuitry
1720 Transceiver

The invention claimed is:

1. A station comprising:
circuitry, which, in operation, performs Wake-Up Radio (WUR) mode operation state transition between three states including:
a first state in which wake-up operating parameters are not in place;
a second state in which the wake-up operating parameters are in place and WUR mode operation is not operated; and
a third state in which the circuitry is in the WUR mode operation, wherein:
the circuitry in the first state is capable of performing the WUR mode operation state transition to the third state by transitioning to the second state and without transitioning to the second state,
the circuitry in the second state maintains the wake-up operating parameters in response to the WUR mode operation state transition from the third state to the second state, and
the circuitry, in the second state, is capable of updating the wake-up operating parameters; and
a transmitter, which, in operation, transmits a WUR mode setup frame to an Access Point (AP), the WUR mode setup frame indicating the WUR mode operation state transition of the circuitry, wherein, when the circuitry transitions to the third state without transitioning to the second state, the WUR mode setup frame comprises the wake-up operating parameters.

2. The station according to claim 1, comprising:
a receiver, which, in operation, receives a response frame from the AP in response to the WUR mode setup frame, wherein the circuitry performs the WUR mode operation state transition in response to the response frame indicating that the AP accepts a request of the WUR mode setup frame.

3. The station according to claim 1, wherein the circuitry, in operation, tears down the WUR mode operation by initiating WUR mode teardown frame.

4. A communication method implemented by a station, the communication method comprising:
performing Wake-Up Radio (WUR) mode operation state transition between three states including:
a first state in which wake-up operating parameters are not in place;
a second state in which the wake-up operating parameters are in place and WUR mode operation is not operated; and
a third state in which the WUR mode operation is operated, wherein:
the station in the first state is capable of performing the WUR mode operation state transition to the third state by transitioning to the second state and without transitioning to the second state, the station in the second state maintains the wake-up operating parameters in response to the WUR mode operation state transition from the third state to the second state, and the station in the second state is capable of updating the wake-up operating parameters; and
transmitting a WUR mode setup frame to an Access Point (AP), the WUR mode setup frame indicating the WUR mode operation state transition of the station, wherein, when the circuitry transitions to the third state without transitioning to the second state, the WUR mode setup frame comprises the wake-up operating parameters.

* * * * *